(12) United States Patent
Papasakellariou

(10) Patent No.: US 11,201,701 B2
(45) Date of Patent: *Dec. 14, 2021

(54) TRANSMISSION OF ACKNOWLEDGEMENT INFORMATION IN ADAPTIVELY CONFIGURED TDD COMMUNICATION SYSTEMS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,863

(22) Filed: Oct. 8, 2015

(65) Prior Publication Data

US 2016/0028512 A1 Jan. 28, 2016

Related U.S. Application Data

(63) Continuation of application No. 14/204,979, filed on Mar. 11, 2014, now Pat. No. 9,191,930.

(Continued)

(51) Int. Cl.
*H04L 1/18* (2006.01)
*H04L 5/00* (2006.01)
(Continued)

(52) U.S. Cl.
CPC ......... *H04L 1/1861* (2013.01); *H04B 7/2643* (2013.01); *H04L 1/1854* (2013.01);
(Continued)

(58) Field of Classification Search
CPC ... H04B 7/2643; H04L 1/1671; H04L 1/1861; H04L 5/0055; H04L 5/0094;
(Continued)

(56) References Cited

U.S. PATENT DOCUMENTS

2010/0067496 A1* 3/2010 Choi ............... H04W 52/54
370/336
2010/0182939 A1 7/2010 Ojala et al.
(Continued)

FOREIGN PATENT DOCUMENTS

CN 101925118 A 12/2010
CN 102075949 A 5/2011
(Continued)

OTHER PUBLICATIONS

European Patent Office, "Supplementary European Search Report," Application No. 14763395.2-1851, dated Oct. 17, 2016, 9 pages, publisher EPO, Munich, Germany, place of search The Hague.
(Continued)

*Primary Examiner* — Jae Y Lee
*Assistant Examiner* — M Mostazir Rahman

(57) ABSTRACT

Methods and apparatus of a base station or a User Equipment (UE) in communication with each other are provided. The UE is configured by the base station for operation with an adapted Time Division Duplex (TDD) UpLink-Downlink (UL-DL) configuration. A process enabling transmission of acknowledgement information from the UE for communication in two different sets of DL Transmission Time Intervals (TTIs) is provided.

20 Claims, 17 Drawing Sheets

Related U.S. Application Data

(60) Provisional application No. 61/898,269, filed on Oct. 31, 2013, provisional application No. 61/877,121, filed on Sep. 12, 2013, provisional application No. 61/824,855, filed on May 17, 2013, provisional application No. 61/780,227, filed on Mar. 13, 2013.

(51) Int. Cl.
    *H04B 7/26*     (2006.01)
    *H04L 5/14*     (2006.01)
    *H04W 72/04*     (2009.01)
    *H04L 1/16*     (2006.01)

(52) U.S. Cl.
    CPC .......... *H04L 5/0055* (2013.01); *H04L 5/0094* (2013.01); *H04L 5/1469* (2013.01); *H04W 72/0406* (2013.01); *H04W 72/0413* (2013.01); *H04W 72/0446* (2013.01); *H04L 1/1671* (2013.01)

(58) Field of Classification Search
    CPC ............ H04L 5/1469; H04W 72/0406; H04W 72/0413; H04W 72/0446
    See application file for complete search history.

(56) References Cited

U.S. PATENT DOCUMENTS

| | | |
|---|---|---|
| 2010/0284289 A1 | 11/2010 | Suo et al. |
| 2011/0103324 A1 | 5/2011 | Nam et al. |
| 2012/0120854 A1 | 5/2012 | Zhang et al. |
| 2012/0269138 A1 | 10/2012 | Han et al. |
| 2013/0083751 A1* | 4/2013 | Papasakellariou .... H04L 1/1854 370/329 |
| 2013/0121304 A1* | 5/2013 | Nory ........................ H04B 7/04 370/330 |
| 2013/0194980 A1 | 8/2013 | Yin et al. |
| 2013/0242890 A1* | 9/2013 | He .................... H04W 72/0413 370/329 |
| 2013/0279377 A1 | 10/2013 | Zhao et al. |
| 2014/0126491 A1* | 5/2014 | Ekpenyong ........... H04L 5/0055 370/329 |
| 2015/0063250 A1* | 3/2015 | Lahetkangas ......... H04L 1/1812 370/329 |
| 2015/0358137 A1 | 12/2015 | Chae et al. |
| 2017/0079043 A1 | 3/2017 | Papasakellariou et al. |

FOREIGN PATENT DOCUMENTS

| | | |
|---|---|---|
| CN | 102282796 A | 12/2011 |
| CN | 102415014 A | 4/2012 |
| CN | 102598526 A | 7/2012 |
| CN | 102845014 A | 12/2012 |
| KR | 10-2013-0121848 A | 11/2013 |
| KR | 10-2013-0140728 A | 12/2013 |
| KR | 10-20150136468 A | 12/2015 |
| WO | 2012-106840 A1 | 8/2012 |
| WO | 2012113131 A1 | 8/2012 |
| WO | 2014052645 A1 | 4/2014 |
| WO | 2014-109411 A1 | 7/2014 |
| WO | 2014110764 A1 | 7/2014 |
| WO | 2014117323 A1 | 8/2014 |

OTHER PUBLICATIONS

Notice of Acceptance for Patent Application for Australian Application No. 2014230288, dated Sep. 5, 2017. (3 pages).
Alcatel-Lucent Shanghai Bell, et al., "Discussion on HARQ and UL-grant timing with dynamic TDD UL-DL configuration", 3GPP TSG RAN WG1 Meeting #68BIS, R1-121260, Jeju, Korea, Mar. 26-30, 2012. (6 pages).
Communication from a foreign patent office in a counterpart foreign application, "Notification of the First Office Action," Chinese Application No. 201480013102.5, dated Jan. 29, 2018, 27 pages.
Ericsson, ST-Ericsson, "On support of different TDD UL-DL configurations on different bands", 3GPP TSG-RAN WG1 #67, Nov. 14-18, 2011, 6 pages, R1-114414.
New Postcom, "Remaining aspects of PUCCH resource allocation for TDD", 3GPP TSG RAN WG1 Meeting #72, Jan. 28-Feb. 1, 2013, 2 pages, R1-130683.
Research In Motion, UK Limited, "Signalling methods for TDD UL/DL reconfiguration with different time scales", 3GPP TSG RAN WG1 Meeting #72, Jan. 28-Feb. 1, 2013, 4 pages, R1-130701.
Office Action dated Jul. 13, 2018 in connection with Japanese Patent Application No. 2015-562932.
IP Australia Examination report No. 1 for standard patent application, dated Mar. 11, 2019, regarding Application No. 2017279751, 9 pages.
Catt, "Design of L1 signaling for UL-DL reconfiguration", 3GPP TSG RAN WG1 Meeting #74, Aug. 19-13, 2013, R1-133014, 4 pages.
Panasonic, "Reconfiguration message transmission details", 3GPP TSG-RAN WG1 Meeting 74, Aug. 19-23, 2013, R1-133204, 4 pages.
Sharp, "Comparison of HARQ-ACK timing approaches for eIMTA cell", 3GPP TSG RAN WG1 Meeting #74, Aug. 19-23, 2013, R1-133230, 4 pages.
LG Electronics, "Details of UL-DL Reconfiguration Message", 3GPP TSG RAN WG1 Meeting #74, Aug. 19-23, 2013, R1-133366, 6 pages.
Potevio, "On HARQ issues for TDD UL-DL reconfiguration", 3GPP TSG RAN WG1 Meeting #74, Aug. 19-23, 2013, R1-133562, 3 pages.
European Search Report dated Jul. 24, 2019 in connection with European Patent Application No. 19 17 1856, 13 pages.
LG Electronics, "Discussion on the signalling mechanisms for TDD UL-DL reconfiguration", 3GPP TSG RAN WG1 Meeting #72, Jan. 28-Feb. 1, 2013, R1-130261, 3 pages.
Office Action dated Mar. 20, 2020 in connection with India Patent Application No. 2909/KOLNP/2015, 7 pages.
"3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), 108 pages.
"3rd Generation Partnership Project; Technical Specification Group Radio Access Network; Evolved Universal Terrestrial Radio Access (E-UTRA); Multiplexing and channel coding (Release 11)", 3GPP TS 36.212 V11.1.0 (Dec. 2012), 82 pages.
"3rd Generation Partnership Project; Technical Specification Group Radio Access Network; Evolved Universal Terrestrial Radio Access (E-UTRA); Physical layer procedures (Release 11)", 3GPP TS 36.213 V11.1.0 (Dec. 2012), 160 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0 (Sep. 2012), 324 pages.
Communication under Rule 71(3) EPC dated Jun. 26, 2020 in connection with European Patent Application No. 19 171 856.8, 94 pages.
First Office Action in connection with Chinese Application No. 201811081652.7 dated Sep. 27, 2020, 9 pages.
Notification to Grant Patent Right for Invention dated May 18, 2021, in connection with Chinese Application No. 201811081652.7, 7 pages.
Decision of Patent dated Jun. 2, 2021, in connection with Korean Application No. 10-2021-7002107, 4 pages.
ITRI, "Maximum number of DL HARQ processes for TDD interband CA with different TDD UL-DL configurations," R1-124478, 3GPP TSG-RAN WG1 Meeting #70bis, San Diego, USA, Oct. 8-12, 2012, 7 pages.

\* cited by examiner

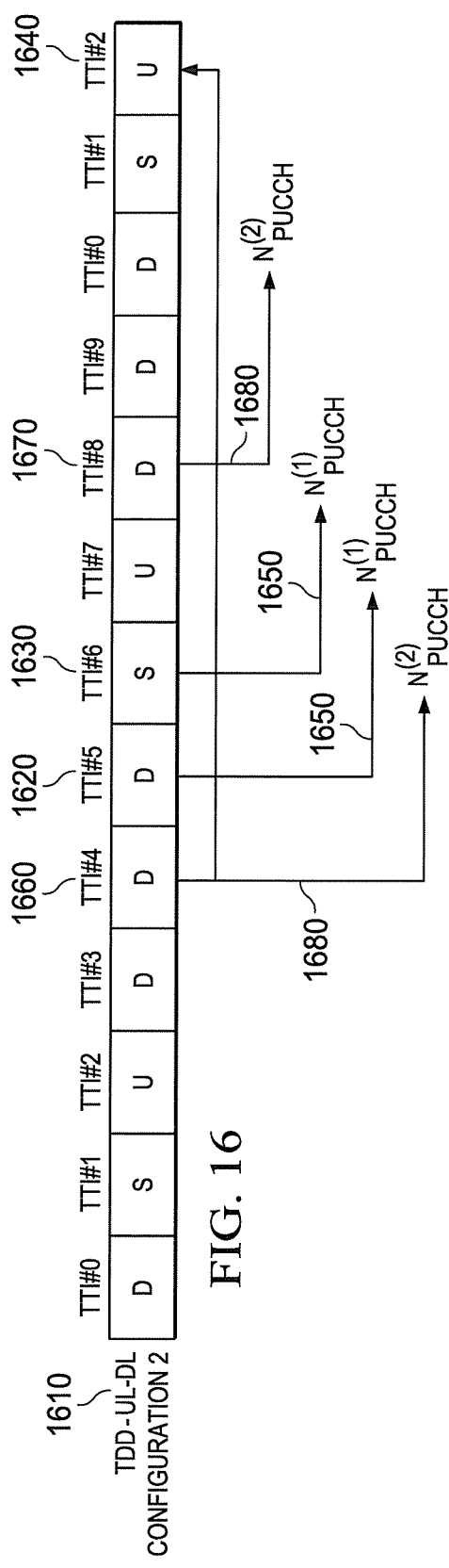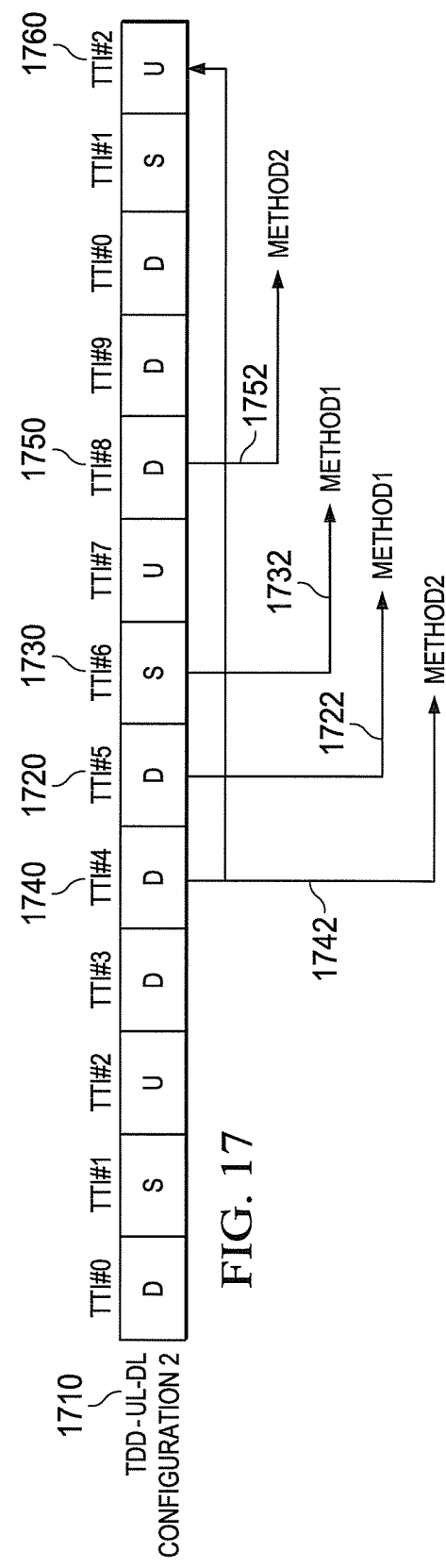

TRANSMISSION OF ACKNOWLEDGEMENT INFORMATION IN ADAPTIVELY CONFIGURED TDD COMMUNICATION SYSTEMS

CROSS-REFERENCE TO RELATED APPLICATION AND CLAIM OF PRIORITY

The present application is a continuation of U.S. Non-Provisional patent application Ser. No. 14/204,979 filed Mar. 11, 2014 and entitled "Transmissions of Acknowledgement Information in Adaptively Configured TDD Communication Systems," which claims priority to U.S. Provisional Patent Application Ser. No. 61/780,227 filed Mar. 13, 2013 and entitled "Transmissions of Acknowledgement Signals in Adaptively Configured TDD Communication Systems," U.S. Provisional Patent Application Ser. No. 61/824,855 filed May 17, 2013 and entitled "Transmission of Uplink Control Information in Adaptively Configured TDD Communication Systems," U.S. Provisional Patent Application Ser. No. 61/877,121 filed Sep. 12, 2013 and entitled "Transmission and Coding of Uplink Control Information in Adaptive TDD Communication Systems," and U.S. Provisional Patent Application 61/898,269 filed Oct. 31, 2013 and entitled "Transmission and Coding of Uplink Control Information in Adaptive TDD Communication Systems." The above-identified patent documents are hereby incorporated by reference in their entirety.

TECHNICAL FIELD

The present application relates generally to wireless communications and, more specifically, to transmitting acknowledgement information in adaptively configured time division duplex (TDD) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

This disclosure provides a method and apparatus for transmitting acknowledgement information signaling in adaptively configured time division duplex (TDD) communication systems.

In a first embodiment, a method is provided. The method includes transmitting, by a base station to a User Equipment (UE), configuration information for a first Time Division Duplex (TDD) UpLink-DownLink (UL-DL) configuration, a second TDD UL-DL configuration, and a third TDD UL-DL configuration. The method also includes transmitting, by the base station to the UE in a DL or special SubFrame (SF) of the third TDD UL-DL configuration, either a Physical DL Control CHannel (PDCCH) or an Enhanced PDCCH (EPDCCH) conveying a DL Control Information (DCI) format that schedules to the UE either a reception of a Physical DL Shared CHannel (PDSCH) or a release of a Semi-Persistently Scheduled (SPS) PDSCH in the DL or special SF. If the DCI format is conveyed by the EPDCCH it includes an Acknowledgement Resource Offset (ARO) field. In response to receiving, by the UE, the first TDD UL-DL configuration, the second TDD UL-DL configuration, and the third TDD UL-DL configuration, the UE determines, according to the second TDD UL-DL configuration, an UL SF to transmit acknowledgement information in response to at least one reception of PDSCH or SPS PDSCH release in a set of DL or special SFs of the third TDD UL-DL configuration. The UE also receives a number of PDSCHs and SPS PDSCH release in a subset of the set of DL or special SFs. The UE also determines acknowledgement information for the set of DL and special SFs in response to at least the reception of the number of PDSCHs and SPS PDSCH release in the subset of the set of DL or special SFs. The UE further determines a first subset of the set of DL or special SFs that are DL or special SFs in the first TDD UL-DL configuration for which acknowledgement information is transmitted in the UL SF and a second subset of the set of DL or special SFs comprising of DL or special SFs that are not in the first subset. The UE also determines a first set of resources and a second set of resources in the UL SF. A resource in the first set of resources corresponds to a SF in the subset that is in the first subset. The resource is determined either using a first offset if the reception is scheduled by a PDCCH or using the ARO field and a second offset if the reception is scheduled by an EPDCCH. A resource in the second set of resources corresponds to a SF in the subset that is in the second subset. The resource is determined using a third offset if the reception is scheduled by a PDCCH or using the ARO field and the second offset if the reception is scheduled by an EPDCCH. The UE also selects, from the first set of resources or from the second set of resources, a resource of a physical UL control channel to transmit the acknowledgement information based on the values of the acknowledgement information. The UE further transmits, to the base station, the acknowledgement information in the selected resource.

In a second embodiment, a method is provided. The method includes transmitting, by a base station to a User Equipment (UE), configuration information for a first Time Division Duplex (TDD) UpLink-DownLink (UL-DL) configuration and a second TDD UL-DL configuration. Each UL SubFrame (SF) in the second TDD UL-DL configuration is also an UL SF in the first TDD UL-DL configuration. The method also includes transmitting, by the base station to the UE in a DL SF of the first TDD UL-DL configuration, a control channel conveying a DL Control Information (DCI) format that schedules a transmission by the UE of a Physical UL Shared CHannel (PUSCH) in an UL SF of the first TDD UL-DL configuration and includes at least a field of binary elements. The UE can transmit acknowledgement information in the PUSCH if the UL SF is also an UL SF in the second TDD UL-DL configuration. If the UE can transmit acknowledgment information in the UL SF, the field functions as a DL Assignment Index (DAD informing the UE of a number of DL or special SFs for the UE to transmit acknowledgement information. If the UE cannot transmit acknowledgment information in the UL SF and the UE operates with a TDD UL-DL configuration that does not have more UL SFs than DL and special SFs, the field value is always set to zero.

In a third embodiment, a method is provided. The method includes transmitting, by a base station to a User Equipment (UE), configuration information for a first Time Division Duplex (TDD) UpLink-DownLink (UL-DL) configuration, a second TDD UL-DL configuration, and a third TDD UL-DL configuration. The method also includes transmitting, by the base station to the UE in a DL or special SubFrame (SF) of the third TDD UL-DL configuration, a Physical DL Control CHannel (PDCCH). The PDCCH is of a first type or of a second type and conveys a DL Control Information (DCI) format that schedules to the UE in the DL or special SF either a reception of a Physical DL Shared CHannel (PDSCH) or a release of a Semi-Persistently Scheduled (SPS) PDSCH. In response to receiving, by the UE, the first TDD UL-DL configuration, the second TDD UL-DL configuration, and the third TDD UL-DL configuration, the UE determines, according to the second TDD UL-DL configuration, an UL SF to transmit acknowledgement information in response to at least one reception of PDSCH or SPS PDSCH release in a set of DL or special SFs of the third TDD UL-DL configuration. The UE receives a number of PDSCHs and SPS PDSCH release in a subset of the set of DL or special SFs. The UE also determines acknowledgement information for the set of DL and special SFs in response at least to the reception of the number of PDSCHs and SPS PDSCH release in the subset of the set of DL or special SFs. The UE further determines a first subset of the set of DL or special SFs that are DL or special SFs in the first TDD UL-DL configuration for which acknowledgement information is transmitted in the UL SF and a second subset of the set of DL or special SFs comprising of DL or special SFs that are not in the first subset. The UE transmits, to the base station, the acknowledgement information. Acknowledgement information corresponding to the first set of DL or special SFs and the second set of DL SFs is transmitted in the UL SF. Each SF in the subset of the one or more DL or special SFs is either in the first set or in the second set. The UE further transmits to the base station, the acknowledgement information. Acknowledgement information corresponding to DL or special SFs in the first subset is ordered prior to acknowledgement information corresponding to DL SFs in the second subset if the transmission is in a Physical UL Control CHannel (PUCCH) and wherein acknowledgement information is ordered according to the index of a DL or special SF in the second TDD UL-DL configuration if the transmission is in a Physical UL Shared CHannel (PUSCH).

In a fourth embodiment, a base station is provided. The base station includes a transmitter configured to transmit, to a User Equipment (UE), signaling indicating a first Time Division Duplex (TDD) UpLink-DownLink (UL-DL) configuration, signaling indicating a second TDD UL-DL configuration, and signaling indicating a third TDD UL-DL configuration. The base station also includes a transmitter configured to transmit, to the UE, either a Physical DL Control CHannel (PDCCH) or an Enhanced PDCCH (EPDCCH), in a DL or special SubFrames (SFs) of the third TDD UL-DL configuration, conveying a DL Control Information (DCI) format that schedules to the UE either a reception of a Physical DL Shared CHannel (PDSCH) or a release of a Semi-Persistently Scheduled (SPS) PDSCH in the DL or special SF. If the DCI format is conveyed by the EPDCCH it includes an Acknowledgement Resource Offset (ARO) field. The base station includes a receiver configured to receive, from the UE, acknowledgement information in a resource of a physical UL control channel from a first set of resources or from a second set of resources. The base station includes a processor configured to determine an UL SF, according to the second TDD UL-DL configuration, for receiving acknowledgement information for a set of DL or special SFs in the third TDD UL-DL configuration. The acknowledgement information is in response to at least one transmission of PDSCH or SPS PDSCH release in the set of DL or special SFs. The base station also includes a processor configured to determine a first subset of the set of DL or special SFs that are DL or special SFs in the first TDD UL-DL configuration for which acknowledgement information is transmitted in the UL SF and a second subset of the set of DL or special SFs comprising of DL or special SFs that are not in the first subset. The base station further includes a processor configured to determine the first set of resources and the second set of resources in the UL SF. A resource in the first set of resources corresponds to a SF in the first set and is determined either using the first offset if the transmission is scheduled by a PDCCH or using the ARO field and a second offset if the transmission is scheduled by an EPDCCH. A resource in the second set of resources corresponds to a SF that is in the second set and is determined using a third offset if the transmission is scheduled by a PDCCH or using the ARO field and the second offset if the transmission is scheduled by an EPDCCH.

In a fifth embodiment, a User Equipment (UE) is provided. The UE includes a receiver configured to receive, from a base station, signaling indicating a first Time Division Duplex (TDD) UpLink-DownLink (UL-DL) configuration, signaling indicating a second TDD UL-DL configuration, and signaling indicating a third TDD UL-DL configuration. The UE also includes a receiver configured to receive, from the base station, either a Physical DL Control CHannel (PDCCH) or an Enhanced PDCCH (EPDCCH), in a DL or special SubFrames (SFs) of the third TDD UL-DL configuration, conveying a DL Control Information (DCI) format that schedules to the UE either a reception of a Physical DL Shared CHannel (PDSCH) or a release of a Semi-Persistently Scheduled (SPS) PDSCH in the DL or special SF. If the DCI format is conveyed by the EPDCCH it includes an Acknowledgement Resource Offset (ARO) field. The UE includes a transmitter configured to transmit, to the base station, acknowledgement information in a resource of a physical UL control channel from a first set of resources or from a second set of resources. The UE includes a processor configured to determine an UL SF, according to the second TDD UL-DL configuration, for the transmitting the acknowledgement information for a set of DL or special SFs in the third TDD UL-DL configuration. The acknowledgement information is in response to at least one reception of PDSCH or SPS PDSCH release in the set of DL or special SFs. The UE also includes a processor configured to determine a first subset of the set of DL or special SFs that are DL or special SFs in the first TDD UL-DL configuration for which acknowledgement information is transmitted in the UL SF and a second subset of the set of DL or special SFs comprising of DL or special SFs that are not in the first subset. The UE further includes a processor configured to determine the first set of resources and the second set of resources in the UL SF. A resource in the first set of resources corresponds to a SF in the first set and is determined either using a first offset if the reception is scheduled by a PDCCH or using the ARO field and a second offset if the reception is scheduled by an EPDCCH. A resource in the second set of resources corresponds to a SF that is in the second set and is determined using a third offset if the reception is scheduled by a PDCCH or using the ARO field and the second offset if the reception is scheduled by an EPDCCH.

In a sixth embodiment, a base station is provided. The base station includes a transmitter configured to transmit, to a User Equipment (UE), signaling indicating a first Time Division Duplex (TDD) UpLink-DownLink (UL-DL) configuration and signaling indicating a second TDD UL-DL configuration. Each UL SubFrame (SF) in the second TDD UL-DL configuration is also an UL SF in the first TDD UL-DL configuration. The base station also includes a transmitter configured to transmit, to the UE in a DL SF of the first TDD UL-DL configuration, a control channel conveying a DL Control Information (DCI) format that schedules a transmission, by the UE, of a Physical UL Shared CHannel (PUSCH) in an UL SF of the first TDD UL-DL configuration and includes at least a field of binary elements. The UE can include acknowledgement information in the PUSCH if the UL SF is also an UL SF in the second TDD UL-DL configuration. If the UE can transmit acknowledgment information in the UL SF, the field functions as a DL Assignment Index (DAI) informing the UE of a number of DL or special SFs for the UE to transmit acknowledgement information. If the UE cannot transmit acknowledgment information in the UL SF and the UE operates with a TDD UL-DL configuration that does not have more UL SFs than DL and special SFs, the field value is always set to zero.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example determination of a PUCCH resource for HARQ-ACK signal transmission using a PUCCH resource offset depending on a DL TTI index of a respective PDSCH reception in an adapted TDD UL-DL configuration according to this disclosure;

FIG. 17 illustrates an example implicit or explicit determination of a PUCCH resource for HARQ-ACK signaling depending on whether or not a respective DL TTI index is included in a conventional TDD UL-DL configuration, respectively, according to this disclosure;

DETAILED DESCRIPTION

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.1.0, "E-UTRA, Physical channels and modulation" (REF 1); 3GPP TS 36.212 v11.1.0, "E-UTRA, Multiplexing and Channel coding" (REF 2); 3GPP TS 36.213 v11.1.0, "E-UTRA, Physical Layer Procedures" (REF 3); and 3GPP TS 36.331 v11.1.0, "E-UTRA, Radio Resource Control (RRC) Protocol Specification." (REF 4).

This disclosure relates to the adaptation of communication direction in wireless communication networks that utilize Time Division Duplex (TDD). A wireless communication network includes a DownLink (DL) that conveys signals from transmission points (such as base stations or eNodeBs) to user equipments (UEs). The wireless communication network also includes an UpLink (UL) that conveys signals from UEs to reception points such as eNodeBs.

Figure 1:
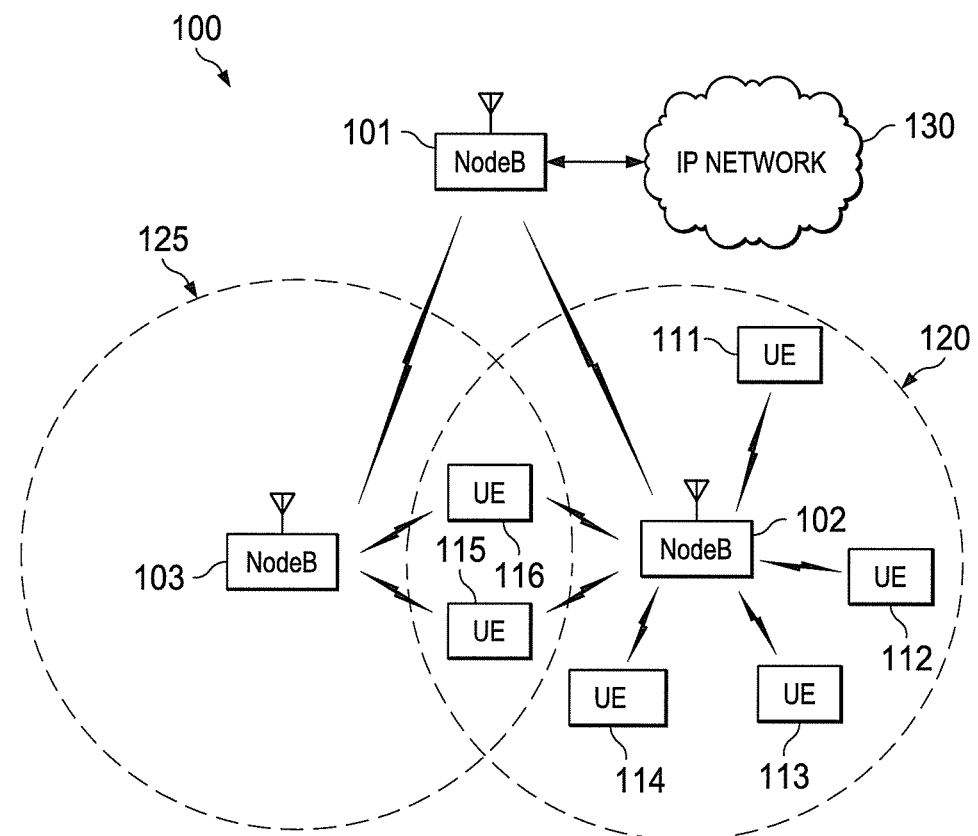
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support transmitting acknowledgement information signaling in the network 100, which can utilize TDD.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
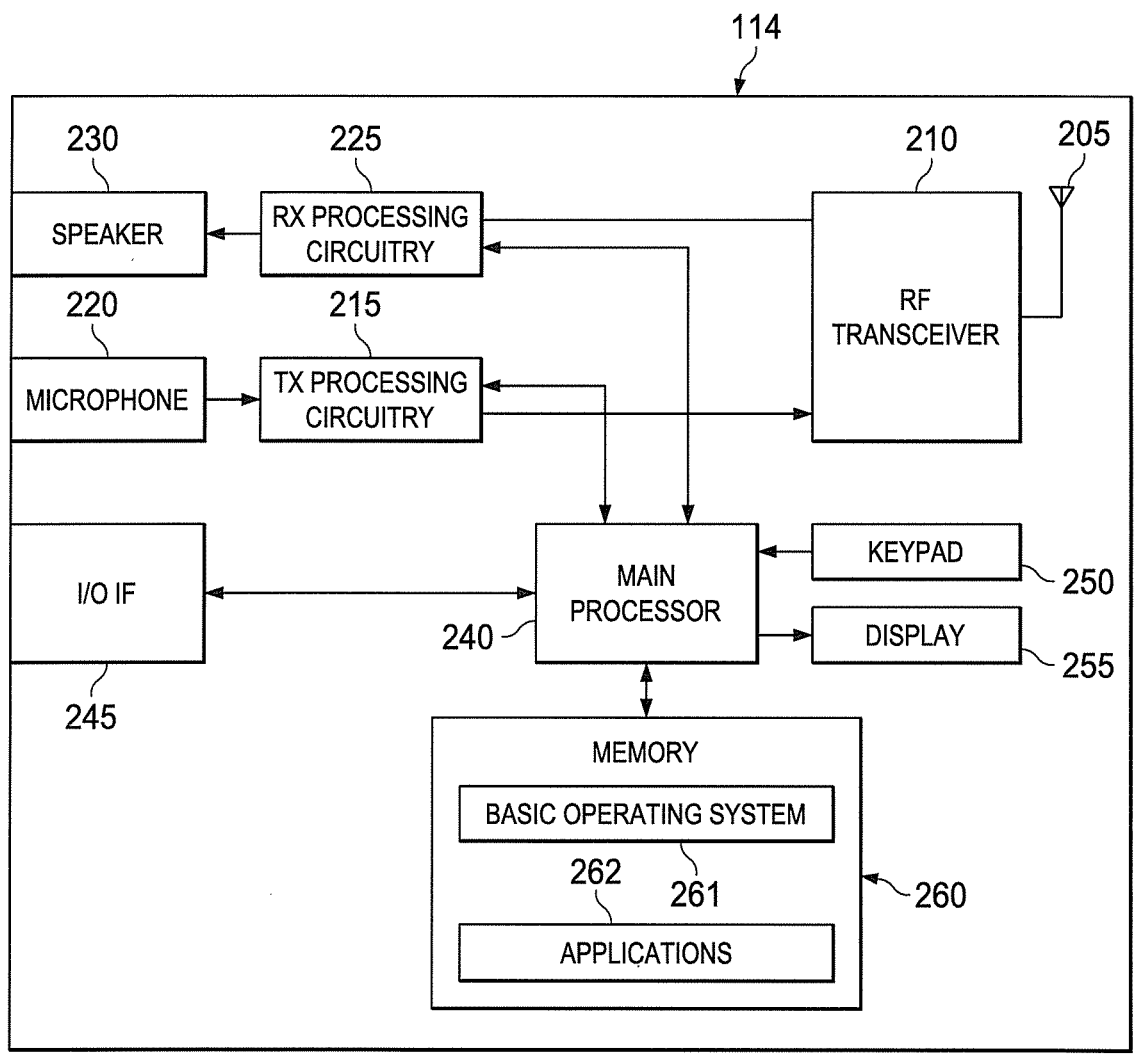
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process such as operations in support of transmitting acknowledgement signals in adaptively configured time division duplex (TDD) communication systems. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support downlink signaling for uplink and downlink adaptation in adaptively configured TDD systems.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
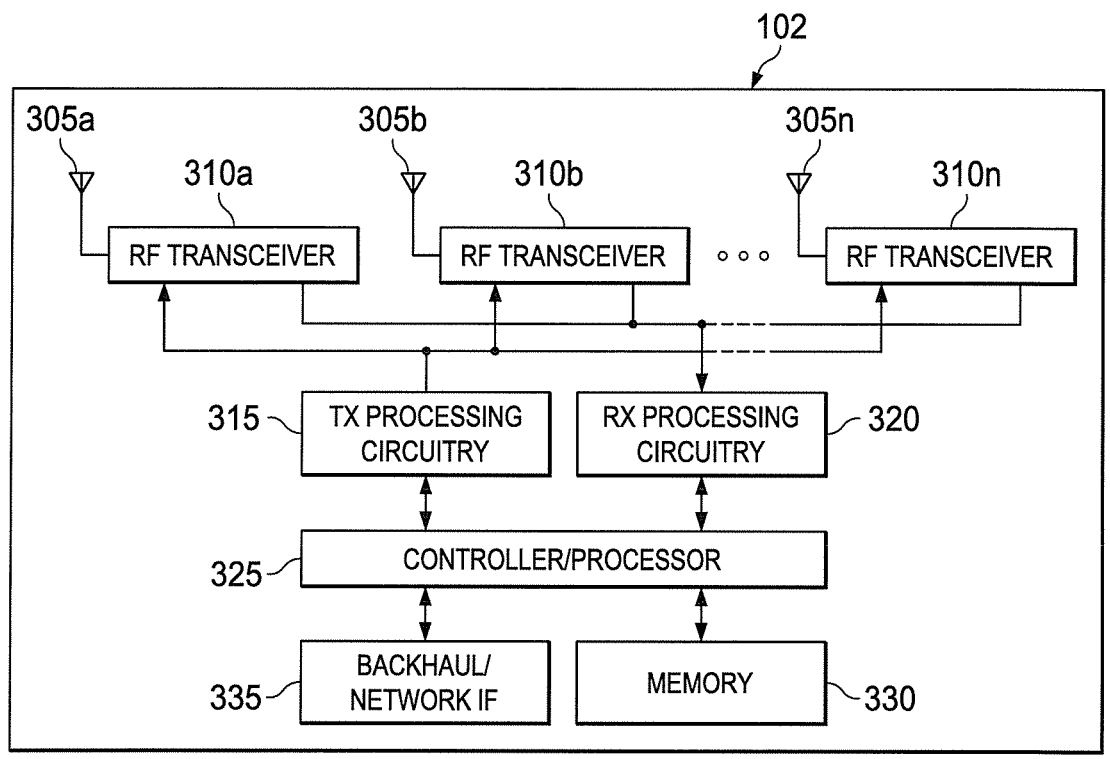
FIG. 3 illustrates an example eNodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS and operations in support of providing channel state information for scheduling downlink transmissions in adaptively configured time division duplex (TDD) communication systems. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support downlink signaling for uplink and downlink adaptation in adaptively configured TDD systems.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS). An eNB transmits data information through respective Physical DL Shared CHannels (PDSCHs). An eNB transmits DCI over Physical DL Control CHannels (PDCCHs) or Enhanced PDCCHs (EPDCCHs). A PDCCH is transmitted over one or more Control Channel Elements (CCEs) while an EPDCCH is transmitted over ECCEs (see also REF 1). An eNB, such as eNB 102, transmits one or more of multiple types of RS including a UE-Common RS (CRS), a Channel State Information RS (CSI-RS), and a DeModulation RS (DMRS). A CRS is effectively transmitted over an entire DL BandWidth (BW) and can be used by UEs, such as UE 114, to demodulate PDSCH or PDCCH, or to perform measurements. eNB 102 also can transmit CSI-RS with a smaller density in the time and/or frequency domain than a CRS. DMRS is transmitted only in a BW of a respective PDSCH or PDCCH and UE 114 can use a DMRS to coherently demodulate information in a PDSCH or EPDCCH (see also REF 1).

In some wireless networks, UL signals can include data signals conveying information content, control signals conveying UL Control Information (UCI), and RS. UE 114 transmits data information or UCI through a respective Physical UL Shared CHannel (PUSCH) or a Physical UL Control CHannel (PUCCH). If UE 114 transmits data information and UCI in a same Transmission Time Interval (TTI), UE 114 can multiplex both in a PUSCH. UCI includes Hybrid Automatic Repeat reQuest ACKnowledgement (HARQ-ACK) information, indicating correct (ACK) or incorrect (NACK) detection of data Transport Blocks (TBs) in a PDSCH, Scheduling Request (SR) indicating whether UE 114 has data in its buffer, and Channel State Information (CSI) enabling eNB 102 to select appropriate parameters for PDSCH or PDCCH transmissions to UE 114. If UE 114 fails to detect a PDCCH scheduling a PDSCH, UE 114 can indicate this using a HARQ-ACK state referred to as DTX. A DTX and a NACK can often be mapped on a same value (NACK/DTX value, see also REF 3). UL RS includes DMRS and Sounding RS (SRS). DMRS is transmitted only in a BW of a respective PUSCH or PUCCH. eNB 102 can use a DMRS for coherent demodulation of information in a PUSCH or PUCCH. SRS is transmitted by UE 114 to provide eNB 102 with an UL CSI.

CSI transmission can be periodic (P-CSI) in a PUCCH with parameters configured to UE 114 by higher layer signaling, such as for example Radio Resource Control (RRC) signaling, or aperiodic (A-CSI) in a PUSCH as triggered by an A-CSI request field included in a DCI format conveyed by a PDCCH scheduling the PUSCH (see also REF 2). DMRS is transmitted only in a BW of a respective PUSCH or PUCCH and eNB 102 can use a DMRS to demodulate information in a PUSCH or PUCCH. SRS is transmitted by UE 114 in order to provide eNB 102 with an UL CSI. SRS transmission from UE 114 can be periodic (P-SRS) at predetermined instances with transmission parameters configured to UE 114 by higher layer signaling or it can be aperiodic (A-SRS) as triggered by a DCI format conveyed by a PDCCH scheduling PUSCH or PDSCH (see also REF 2).

A CSI report from UE 114 includes a Channel Quality Indicator (CQI) and the CSI report can also include a Precoding Matrix Indicator (PMI). The CQI indicates to eNB 102 a Modulation and Coding Scheme (MCS) for a PDSCH transmission to UE 114. The PMI indicates a combining of a PDSCH transmission from multiple eNB antenna ports in accordance with a Multiple Input Multiple Output (MIMO) transmission method. An RI report from UE 114 provides information to a serving eNB for a number of spatial layers that can be supported for a PDSCH. TABLE 1 indicates exemplary values for a 4-bit CQI (16 index values) transmitted in a PUCCH (see also REF 3). TABLE 1A indicates a mapping for an MCS field, $I_{MCS}$, in a DCI format scheduling a PDSCH to a modulation order ($Q_m$) and a Transport Block Size (TBS) index, $I_{TBS}$ for data transmission in the PDSCH. When UE 114 experiences a high Signal-to-Noise and Interference Ratio (SINR), it can be configured by eNB 102 a CQI Table having 16 index values, similar to TABLE 1, and a Modulation and TBS index Table, similar to TABLE 1A, but also including use of 256QAM modulation to support higher values for spectral efficiency.

TABLE 1

4-bit CQI Table

| CQI index | Modulation | code rate × 1024 | efficiency |
| --- | --- | --- | --- |
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 1A

Modulation and TBS index table for PDSCH

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

A DMRS or SRS transmission can be through a transmission of a respective Zadoff-Chu (ZC) sequence (see also REF 1). Different CSs of a ZC sequence can provide orthogonal ZC sequences and can be allocated to different UEs to achieve orthogonal multiplexing of respective HARQ-ACK signals and RS in a same PRB. Such orthogonal multiplexing can also be in the time domain using Orthogonal Covering Codes (OCC). In this manner, as is subsequently described, a PUCCH multiplexing capacity per RB is increased by a factor of 3 (determined by the OCC with the smaller length). A PUCCH resource $n_{PUCCH}$ in a RB for HARQ-ACK signal or DMRS transmission is defined by a pair of an OCC $n_{oc}$ and a CS α. If all resources within a PUCCH RB are used, resources in an immediately next RB can be used.

A PUSCH or a PUCCH transmission power is determined so that an associated signal is received with a desired SINR at eNB 102 while controlling a respective interference to neighboring cells thereby achieving a reception reliability target and ensuring proper network operation. UL Power Control (PC) includes Open-Loop Power Control (OLPC) with cell-specific and UE-specific parameters and Closed Loop Power Control (CLPC) corrections provided by eNB 102 through Transmission Power Control (TPC) commands (see also REF 3). If a PUSCH transmission is scheduled by a PDCCH, a TPC command is included in a respective DCI format. TPC commands can also be provided by a separate PDCCH conveying a DCI format 3 or a DCI format 3A, jointly referred to as DCI format 3/3A, providing TPC commands to a group of UEs. A DCI format includes Cyclic Redundancy Check (CRC) bits and UE 114 identifies a DCI format type from a respective Radio Network Temporary Identifier (RNTI) used to scramble the CRC bits. For DCI format 3/3A, a RNTI is a TPC-RNTI UE 114 is configured by higher layer signaling. For a DCI format scheduling a PUSCH transmission from UE 114 or a PDSCH transmission to UE 114, a RNTI is a Cell RNTI (C-RNTI). Additional RNTI types also exist. A power of a SRS transmission follows a power of a PUSCH transmission power.

Figure 4:
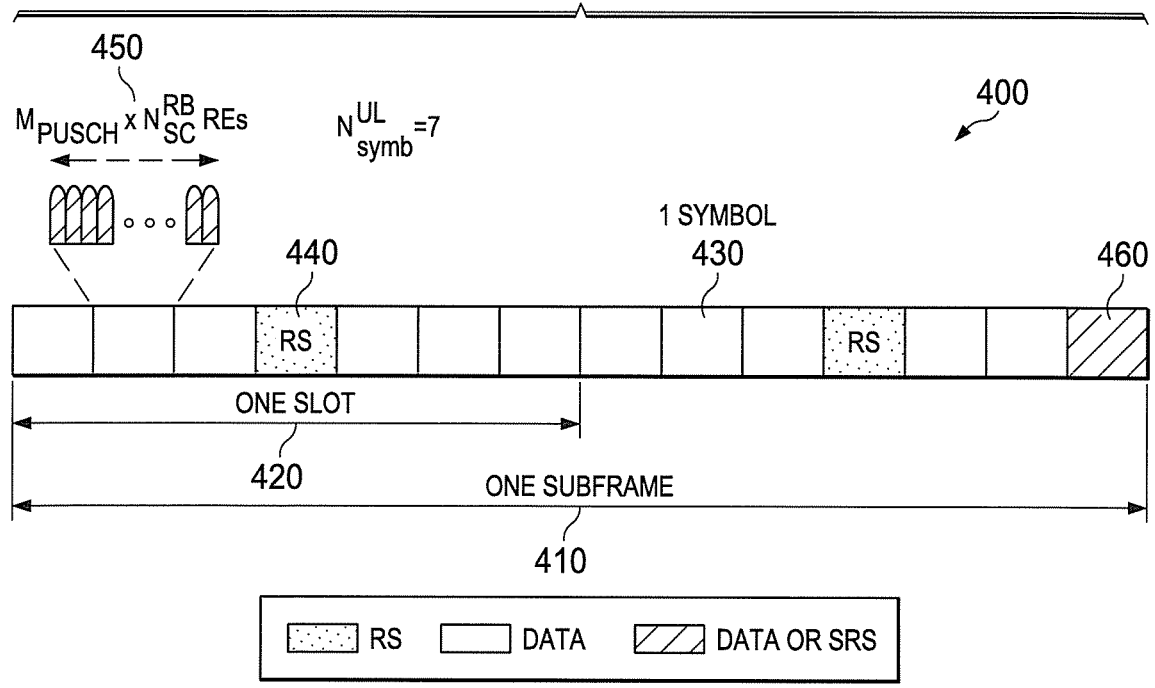
FIG. 4 illustrates an example PUSCH transmission structure over a Transmission Time Interval (TTI) according to this disclosure.

FIG. 4 illustrates an example PUSCH transmission structure over a TTI according to this disclosure. The embodiment of the PUSCH transmission structure 400 over a TTI shown in FIG. 4 is for illustration only. Other embodiments could be used without departing from the scope of the present disclosure.

As shown in FIG. 4, a TTI corresponds to one subframe 410 that includes two slots. Each slot 420 includes $N_{symb}^{UL}$ symbols 430 for transmitting data information, UCI, or RS. Some TTI symbols in each slot are used for transmitting DMRS 440. A transmission BW includes frequency resource units that are referred to as Resource Blocks (RBs). Each RB includes $N_{sc}^{RB}$ sub-carriers, or Resource Elements (REs), and UE 114 is allocated $M_{PUSCH}$ RBs 450 for a total of $M_{sc}^{PUSCH} = M_{PUSCH} \cdot N_{sc}^{RB}$ REs for a PUSCH transmission BW. The last TTI symbol may be used to multiplex SRS transmissions 460 from one or more UEs. A number of TTI symbols available for data/UCI/DMRS transmission is $N_{symb}^{PUSCH} = 2 \cdot (N_{symb}^{UL} - 1) - N_{SRS}$, where $N_{SRS} = 1$ if a last TTI symbol is used to transmit SRS and $N_{SRS} = 0$ otherwise.

Figure 5:
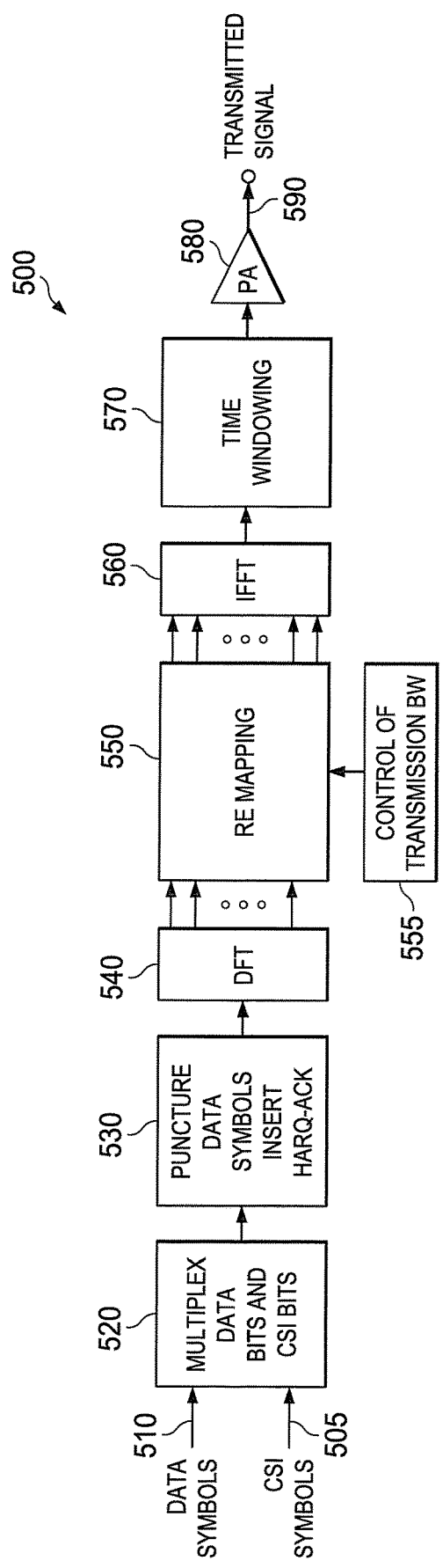
FIG. 5 illustrates an example UE transmitter structure for data information and UCI in a PUSCH according to this disclosure.

FIG. 5 illustrates an example UE transmitter structure for data information and UCI in a PUSCH. The embodiment of the UE transmitter 500 shown in FIG. 5 is for illustration only. Other embodiments could be used without departing from the scope of the present disclosure. In certain embodiments, transmitter 500 is located within UE 114.

As shown in FIG. 5, coded CSI symbols 205 and coded data symbols 510 are multiplexed by multiplexer 520. Coded HARQ-ACK symbols are then inserted by multiplexer 530 by puncturing data symbols and/or CSI symbols. A transmission of coded RI symbols is similar to one for coded HARQ-ACK symbols (not shown). The Discrete Fourier Transform (DFT) is obtained by DFT unit 540, REs 550 corresponding to a PUSCH transmission BW are selected by selector 555, an Inverse Fast Fourier Transform (IFFT) is performed by IFFT unit 560, an output is filtered and by filter 570 and applied a certain power by Power Amplifier (PA) 580 and a signal is then transmitted 590. For brevity, additional transmitter circuitry such as digital-to-analog converter, filters, amplifiers, and transmitter antennas as well as encoders and modulators for data symbols and UCI symbols are omitted for brevity.

Figure 6:
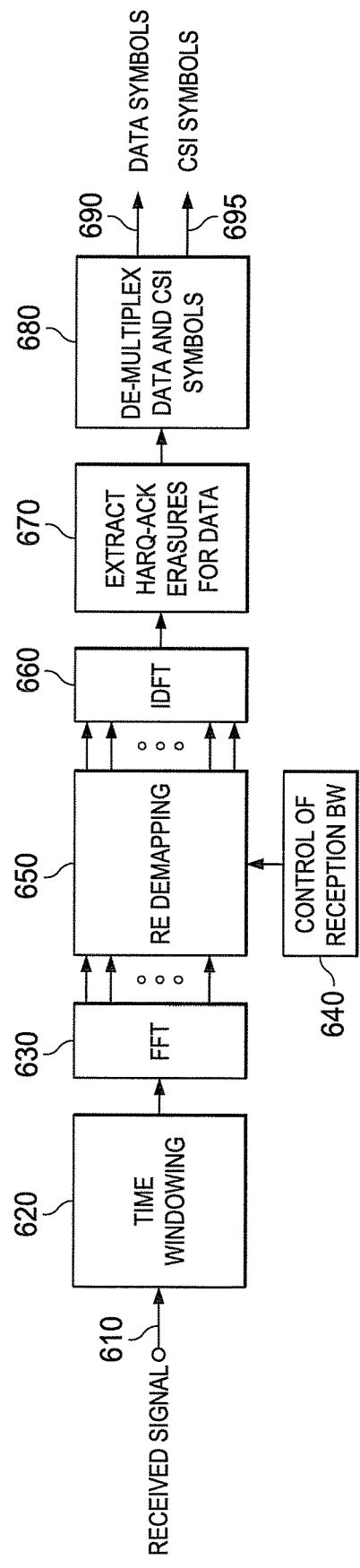
FIG. 6 illustrates an example eNB receiver structure for data information and UCI in a PUSCH according to this disclosure.

FIG. 6 illustrates an example eNB receiver structure for data information and UCI in a PUSCH. The embodiment of the eNB receiver 600 shown in FIG. 6 is for illustration only. Other embodiments could be used without departing from the scope of the present disclosure. In certain embodiments, eNB receiver 600 is located within eNB 102.

As shown in FIG. 6, a received signal 610 is filtered by filter 620, a Fast Fourier Transform (FFT) is applied by FFT unit 630, a selector unit 640 selects REs 650 used by a transmitter, an Inverse DFT (IDFT) unit applies an IDFT 660, a de-multiplexer 670 extracts coded HARQ-ACK symbols and places erasures in corresponding REs for data symbols and CSI symbols and finally another de-multiplexer 680 separates coded data symbols 690 and coded CSI symbols 695. A reception of coded RI symbols is similar to one for coded HARQ-ACK symbols (not shown). Additional receiver circuitry such as a channel estimator, demodulators and decoders for data and UCI symbols are not shown for brevity.

For HARQ-ACK transmission in a PUCCH, or for a joint HARQ-ACK and P-CSI transmission in a PUCCH, a payload of $O_{HARQ-ACK}$ HARQ-ACK bits or a payload of $O_{HARQ-ACK}$ HARQ-ACK bits and $O_{P-CSI}$ bits can be encoded using, for example, a block code. A corresponding PUCCH format is referred to as PUCCH Format 3. Considering for brevity in the following only the case of HARQ-ACK bits, the block code can be a (32, $O_{HARQ-ACK}$) Reed-Mueller (RM) code (also see REF 2). For a Frequency Division Duplex (FDD) system, one or two HARQ-ACK bits can also be transmitted using PUCCH Format 1a or PUCCH Format 1b, respectively, while for a Time Division Duplex (TDD) system up to four HARQ-ACK bits can be transmitted using PUCCH Format 1b with resource multiplexing (see also REF 3).

Figure 7:
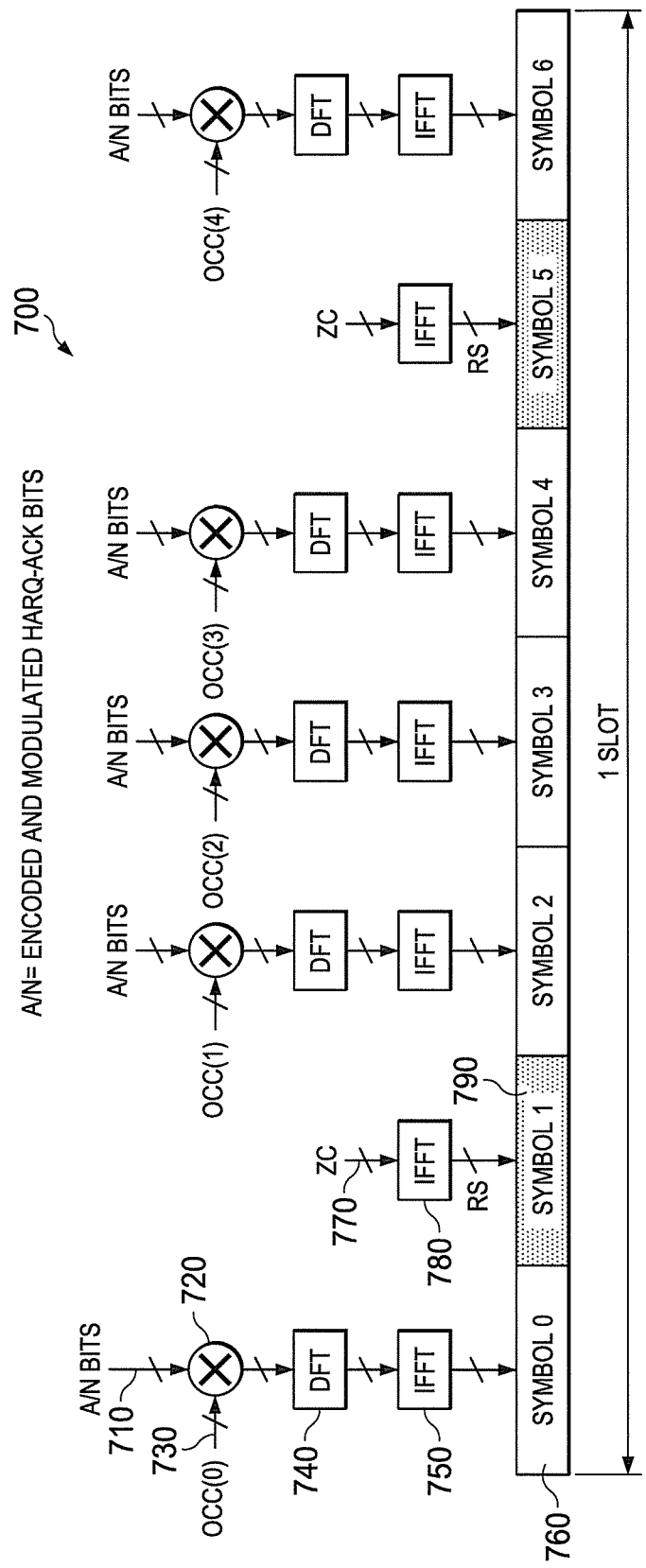
FIG. 7 illustrates an example PUCCH Format 3 structure in one TTI slot for HARQ-ACK transmission with joint coding according to this disclosure.

FIG. 7 illustrates an example PUCCH Format 3 structure in one TTI slot for HARQ-ACK transmission with joint coding according to this disclosure. The embodiment of the transmitter 700 shown in FIG. 7 is for illustration only. Other embodiments could be used without departing from the scope of the present disclosure.

As shown in FIG. 7, after encoding and modulation using respectively, for example, a (32, $O_{HARQ-ACK}$) RM code punctured to a (24, $O_{HARQ-ACK}$) RM code and Quaternary Phase Shift Keying (QPSK) modulation (not shown for brevity), a set of same HARQ-ACK bits 710 is multiplied 720 with elements of an OCC 730 and is subsequently DFT precoded 740. For example, for 5 symbols per slot carrying HARQ-ACK bits, the OCC has length 5 {OCC(0), OCC(1), OCC(2), OCC(3), OCC(4)} and can be either of {1, 1, 1, 1, 1}, or {1, exp(j2π/5), exp(j4π/5), exp(j6π/5), exp(j8π/5)}, or {1, exp(j4π/5), exp(j8π/5), exp(j2π/5), exp(j6π/5)}, or {1, exp(j6π/5), exp(j2π/5), exp(j8π/5), exp(j4π/5)}, or {1, exp(j8π/5), exp(j6π/5), exp(j4π/5), exp(j2π/5)}. The output is passed through an IFFT 750 and it is then mapped to a TTI symbol 760. As the previous operations are linear, their relative order may be inter-changed. A PUCCH is transmitted in one RB over one TTI. Consequently, 24 encoded HARQ-ACK bits are transmitted in each slot and they are mapped to 12 QPSK symbols. The same or different HARQ-ACK bits may be transmitted in the second slot of a TTI. In addition to HARQ-ACK signals, RS are transmitted in each slot to enable coherent demodulation of HARQ-ACK signals. A RS is constructed from a length-12 ZC sequence 770 that is passed through an IFFT 780 and mapped to another TTI symbol 790. Multiplexing of RS from different UE is achieved by using different CSs of a same ZC sequence.

Although the PUCCH Format 3 structure in FIG. 7 can support HARQ-ACK payloads larger than a few bits, it requires large overhead as HARQ-ACK signal transmissions from a maximum of 5 UEs (as determined by the OCC length) can be accommodated per RB. Moreover, a maximum supportable HARQ-ACK payload (or HARQ-ACK and P-CSI payload) is limited to only about 22 bits as a resulting code rate becomes too large for reliable reception in case of payloads larger than 22 bits. For a HARQ-ACK payload (or HARQ-ACK and P-CSI payload) between about 12 and 21 bits, a dual RM code can be used where a mapping to successive elements of a DFT can alternate between elements from an output of a first RM code and elements from an output of a second RM code in a sequential manner (see also REF 1).

Figure 8:
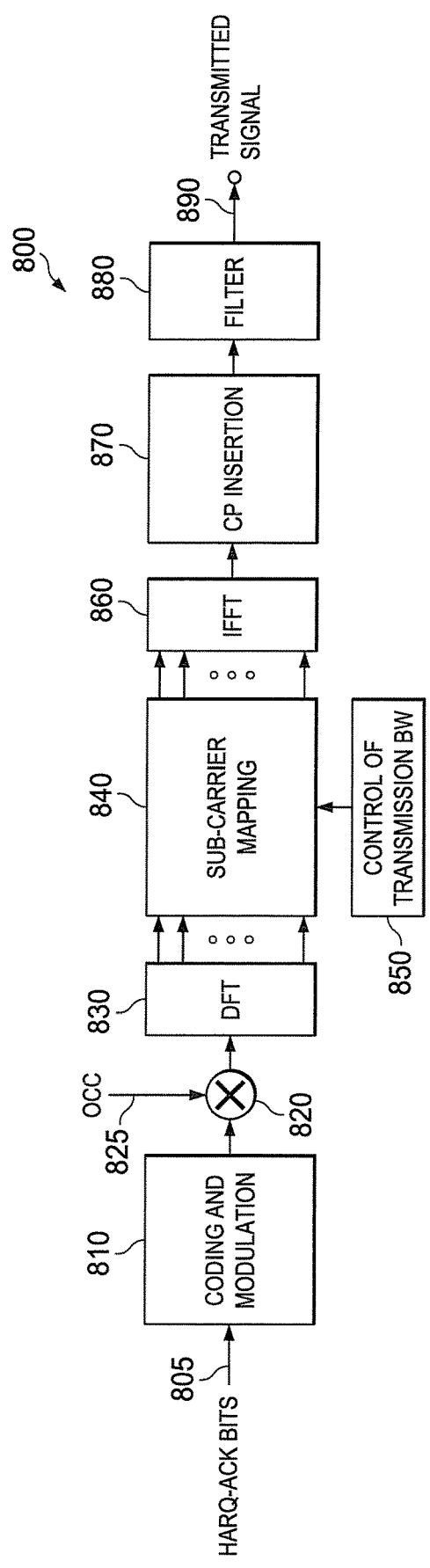
FIG. 8 illustrates an example UE transmitter block diagram for HARQ-ACK information using a PUCCH Format 3 according to this disclosure.

FIG. 8 illustrates an example UE transmitter block diagram for HARQ-ACK information using a PUCCH Format 3 according to this disclosure. The embodiment of the UE transmitter 800 shown in FIG. 8 is for illustration only. Other embodiments could be used without departing from the scope of the present disclosure. In certain embodiments, UE transmitter 800 is located within UE 114.

As shown in FIG. 8, HARQ-ACK information bits 805 are encoded and modulated 810 and then multiplied 820 with an element of an OCC 825 for a respective TTI symbol. After DFT precoding 830, REs 840 of an assigned PUCCH RB are selected 850, an IFFT is performed 860 and finally a Cyclic Prefix (CP) 870 and filtering 880 are applied to a transmitted signal 890.

Figure 9:
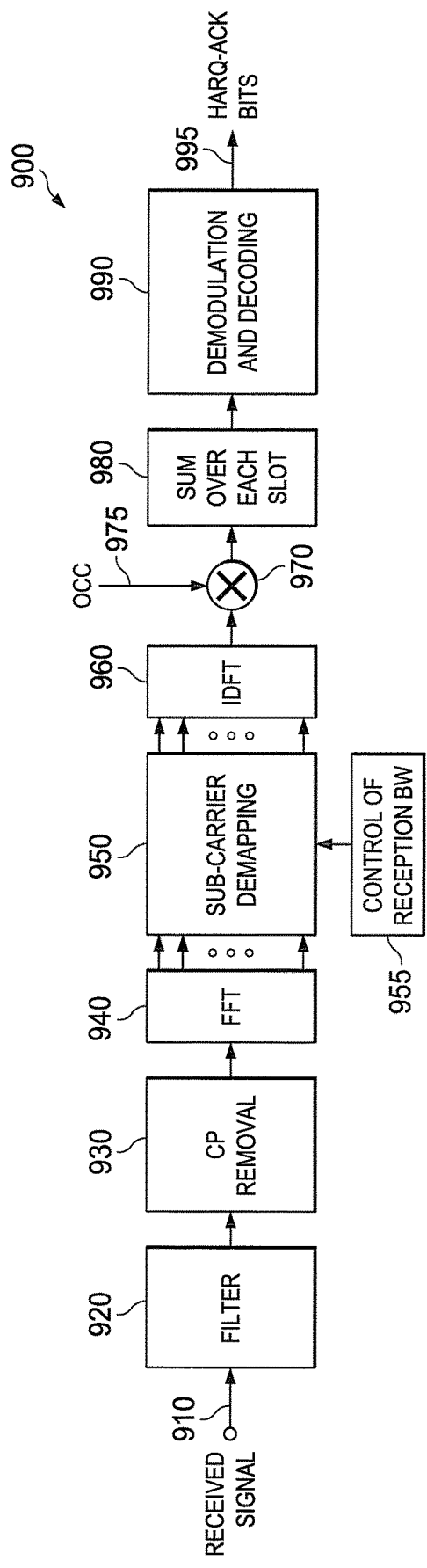
FIG. 9 illustrates an example eNB receiver block diagram for HARQ-ACK information using a PUCCH Format 3 according to this disclosure.

FIG. 9 illustrates an example eNB receiver block diagram for HARQ-ACK information using a PUCCH Format 3 according to this disclosure. The embodiment of the eNB receiver 900 shown in FIG. 9 is for illustration only. Other embodiments could be used without departing from the scope of the present disclosure. In certain embodiments, eNB receiver 900 is located within eNB 102.

As shown in FIG. 9, a received signal 910 is filtered 920 and a CP is removed 930. Subsequently, eNB 102 receiver applies a FFT 940, selects 955 REs 950 used by UE 114 transmitter, applies an IDFT 960, multiplies 970 with a OCC element 975 for a respective TTI symbol, sums the outputs for TTI symbols conveying HARQ-ACK information over each slot 980, and demodulates and decodes summed HARQ-ACK signals over both slots 990 of a TTI to obtain an estimate of transmitted HARQ-ACK information bits 995.

Figure 10:
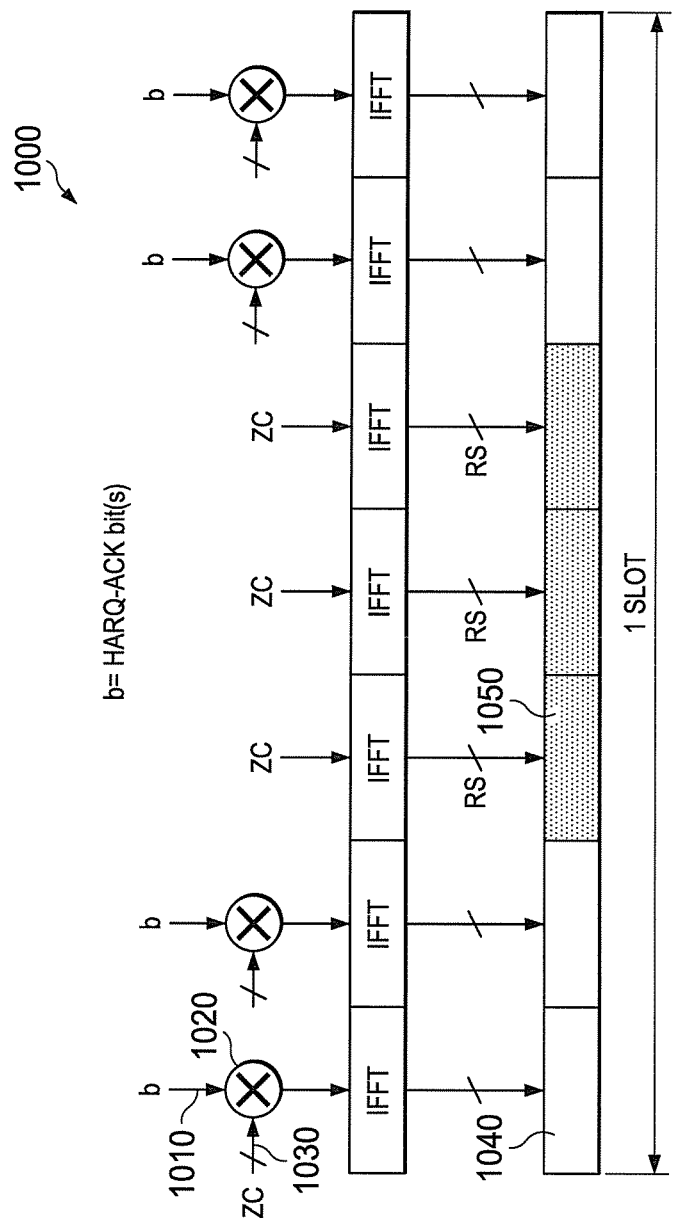
FIG. 10 illustrates an example PUCCH Format 1a/1b structure in one slot of a TTI according to this disclosure.

FIG. 10 illustrates an example PUCCH Format 1a/1b structure in one slot of a TTI according to this disclosure. The example of the PUCCH format structure 1000 shown in FIG. 10 is for illustration only. Other embodiments could be used without departing from the scope of the present disclosure.

As shown in FIG. 10, HARQ-ACK bits b 1010 modulate 1020 a ZC sequence 1030 using Binary Phase Shift Keying (BPSK) or QPSK modulation. A modulated ZC sequence is transmitted after performing an IFFT 1040. A RS is transmitted through an unmodulated ZC sequence 1050.

Figure 11:
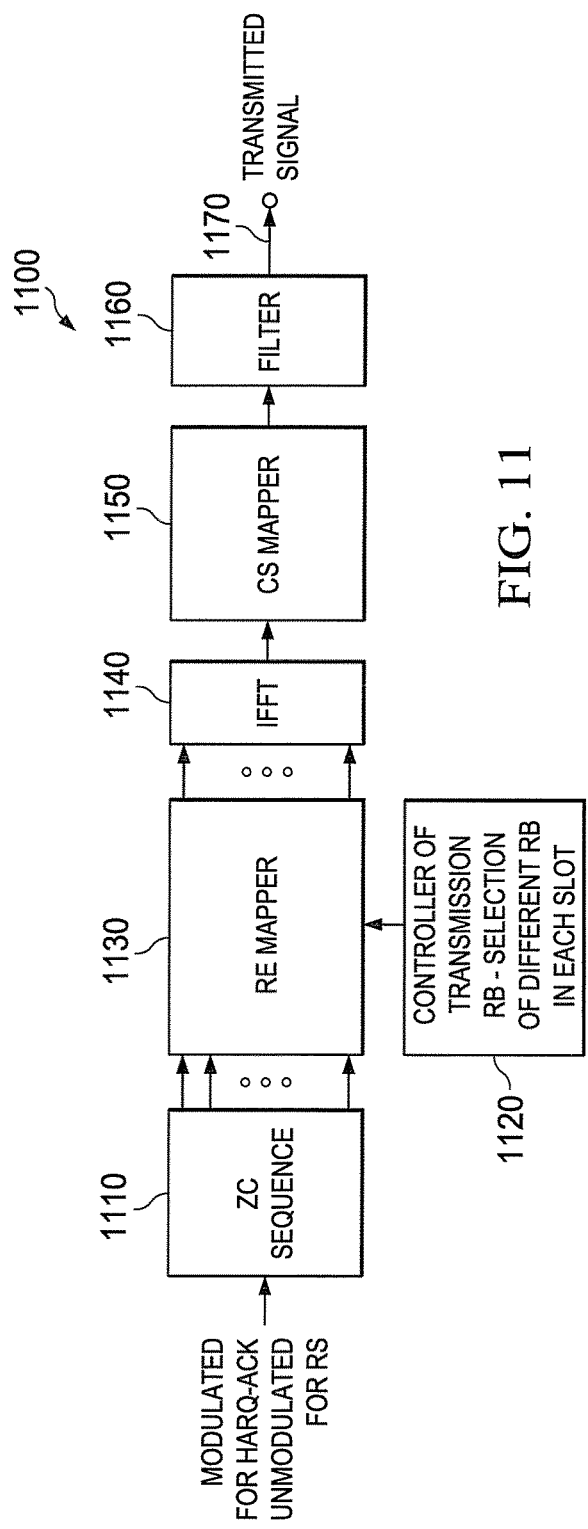
FIG. 11 illustrates an example transmitter structure for a PUCCH Format 1a/1b according to this disclosure.

FIG. 11 illustrates an example transmitter structure for a PUCCH Format 1a/1b according to this disclosure. The embodiment of the transmitter 1100 shown in FIG. 11 is for illustration only. Other embodiments could be used without departing from the scope of the present disclosure. In certain embodiments, the transmitter 1100 is located within UE 114.

As shown in FIG. 11, a ZC sequence is generated in the frequency-domain 1110. A first RB and a second RB are selected 1120 for transmission 1130 of the ZC sequence in a first slot and in a second slot, respectively, an IFFT is performed 1140, and a CS applies to the output 1150 that is then filtered 1160 and transmitted 1170.

Figure 12:
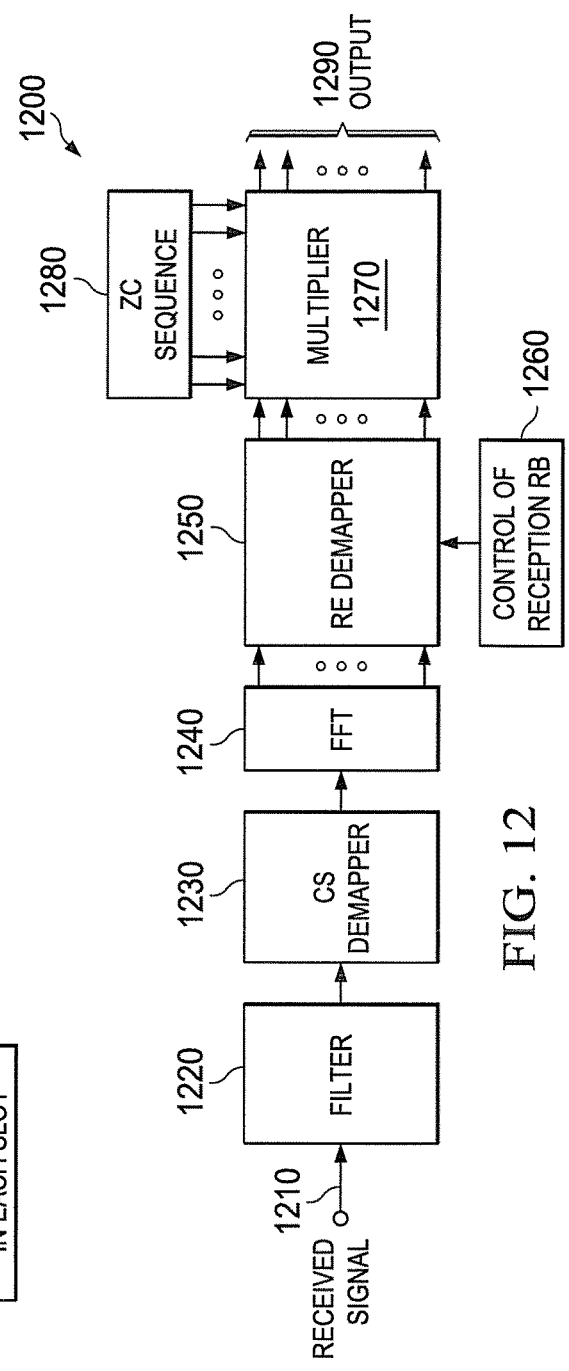
FIG. 12 illustrates an example receiver structure for a PUCCH Format 1a/1b according to this disclosure.

FIG. 12 illustrates an example receiver structure for a PUCCH Format 1a/1b according to this disclosure. The embodiment of the receiver 1200 shown in FIG. 12 is for illustration only. Other embodiments could be used without departing from the scope of the present disclosure. In certain embodiments, receiver 1200 is located within eNB 102.

As shown in FIG. 12, a received signal 1210 is filtered 1220, a CS is restored 1230, a FFT 1240 is applied, a first RB and a second RB 1250 in a first slot and in a second slot, respectively, are selected 1260, and a signal is correlated 1270 with a replica 1280 of a ZC sequence. An output 1290 can then be passed to a channel estimation unit, such as a time-frequency interpolator, in case of the RS, or to a detection unit for the transmitted HARQ-ACK bits.

In a TDD communication system, a communication direction in some TTIs is in the DL, and a communication direction in some other TTIs is in the UL. TABLE 2 lists indicative UL-DL configurations over a period of 10 TTIs (a TTI has a duration of 1 millisecond (msec)), which is also referred to as frame period. "D" denotes a DL TTI, "U" denotes a UL TTI, and "S" denotes a special TTI that includes a DL transmission field referred to as DwPTS, a Guard Period (GP), and a UL transmission field referred to as UpPTS. Several combinations exist for a duration of each field in a special TTI subject to the condition that the total duration is one TTI.

TABLE 2

TDD UL-DL configurations

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a TDD system, a HARQ-ACK signal transmission from UE 114 in response to PDSCH receptions in multiple DL TTIs may be transmitted in a same UL TTI. A number M of DL TTIs for which associated HARQ-ACK signal transmissions from UEs are in a same UL TTI is referred to as a bundling window of size M. A PUCCH resource determination can depend on whether a downlink control channel scheduling a PDSCH or a release of a Semi-Persistently Scheduled (SPS) PDSCH is a PDCCH one or an EPDCCH one (see also REF 3). TABLE 3 indicates DL TTIs n−k, where k∈K, for which an HARQ-ACK signal transmission is in UL TTI n.

TABLE 3

Downlink association set index K: {$k_0, k_1, \ldots k_{M-1}$}

| TDD UL-DL Configuration | TTI n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of EPDCCH, a determination of a PUCCH resource $n_{PUCCH}$ for a HARQ-ACK signal transmission from a first UE antenna port, in response to a detection of a respective EPDCCH in TTI m, can be based on Equation 1 (see also REF 3)

$$n_{PUCCH} = n_{ECCE,n-k_m} + \sum_{i1=0}^{m-1} N_{ECCE,n-k_{i1}} + f(ARO) + N_{PUCCH}^{(e1)} \quad (1)$$

In Equation 1, $n_{CCE,m}$ is a lowest ECCE index of a EPDCCH scheduling a respective PDSCH or a SPS PDSCH release in TTI m, where $0 \le m \le M-1$, $N_{ECCE,n-k_{i1}}$ is a total number of ECCEs in TTI $n-k_m$, $N_{PUCCH}^{(e1)}$ is an offset informed to UE 114 through higher layer signaling by eNB 102, and f(ARO) is a function of a Acknowledgement Resource Offset (ARO) field, including of 2 bits, in a DCI format conveyed by a EPDCCH. For simplicity, an equation for a PUCCH resource determination is not described (see also REF 3).

In case of PDCCH on DL TTI $n-k_m$, a PUCCH Format 1a/1b resource $n_{PUCCH}$ from a first UE antenna port is determined as in Equation 1a (see also REF 3)

$$n_{PUCCH} = (M-m-1) \cdot N_c + m \cdot N_{c+1} + n_{CCE,n-k_m} + N_{PUCCH}^{(1)} \quad (1a)$$

In Equation 1a, $n_{CCE,n-k_m}$ is a lowest CCE index of a PDCCH scheduling a respective PDSCH or a SPS PDSCH release in TTI $n-k_m$, where $0 \le m \le M-1$, $N_c = \max\{0, \lfloor [N_{RB}^{DL} \cdot (N_{sc}^{RB} \cdot c - 4)]/36 \rfloor\}$ where $\lfloor \; \rfloor$ is the 'floor' function that rounds a number to its immediately lower integer, c is a value from $\{0, 1, 2, 3\}$ making $N_c \le n_{CCE} < N_{c+1}$, $N_{RB}^{DL}$ is a number of RBs in a DL operating bandwidth, and $N_{PUCCH}^{(1)}$ is an offset informed to UE 114 through signaling of a System Information Block (SIB) by eNB 102 (see also REF 3).

The TDD UL-DL configurations in TABLE 2 provide 40% and 90% of DL TTIs per frame to be DL TTIs (and the remaining to be UL TTIs). Despite this flexibility, a semi-static TDD UL-DL configuration that can be updated every 640 msec or less frequently by SIB signaling or, in case of DL Carrier Aggregation and a secondary cell by RRC signaling (see also REF3 and REF 4), may not match well with short-term data traffic conditions. For the remaining of this disclosure, such a TDD UL-DL configuration will be referred to as a conventional (or non-adapted) TDD UL-DL configuration and it is assumed to be used by conventional (or legacy) UEs in a cell. For this reason, a faster adaptation period of a TDD UL-DL configuration can improve system throughput, particularly for a low or moderate number of connected UEs. For example, when there is more DL traffic than UL traffic, the TDD UL-DL configuration can be adapted every 10, 20, 40, or 80 msec to include more DL TTIs. Signaling for faster adaptation of a TDD UL-DL configuration can be provided by several mechanisms, including signaling a DCI format in a PDCCH, Medium Access Control (MAC) signaling, or RRC signaling.

An operating constraint in an adaptation of a TDD UL-DL configuration in ways other than conventional ones is the possible existence of UEs that cannot be aware of such adaptation. Such UEs are referred to as conventional UEs. Since conventional UEs perform measurements in DL TTIs using a respective CRS, such DL TTIs cannot be changed to UL TTIs or to special TTIs by a faster adaptation of a TDD UL-DL configuration. However, an UL TTI can be changed to a DL TTI without impacting conventional UEs because eNB 102 can ensure that such UEs do not transmit any signals in such UL TTIs. In addition, an UL TTI common to all TDD UL-DL configurations could exist to enable eNB 102 to possibly select this UL TTI as the only UL one. In some implementations, including all TDD UL-DL configurations in TABLE 2, this UL TTI is TTI #2.

A TTI is referred to as DL flexible TTI if the TTI is an UL TTI in a conventional TDD UL-DL configuration and is adapted to a DL TTI. A TTI is referred to as UL flexible TTI if the TTI is an UL TTI in a conventional TDD UL-DL configuration that could be adapted to a DL TTI in an adapted TDD UL-DL configuration but the TTI remains an UL TTI. A TTI is referred to as DL fixed TTI if the TTI is a DL TTI in a conventional TDD UL-DL configuration. A TTI is referred to as UL fixed TTI if the TTI is an UL TTI in a TDD UL-DL configuration a UE uses to determine UL TTIs for transmitting HARQ-ACK information in response to PDSCH receptions. A special TTI in a conventional configuration can be adapted only to a DL TTI.

Considering the above, TABLE 4 indicates flexible TTIs (denoted by 'F') for each TDD UL-DL configuration in TABLE 2. Evidently, as DL TTIs in a conventional TDD UL-DL configuration cannot be changed to UL TTIs, not all TDD UL-DL configurations can be used for adaptation. For example, if TDD UL-DL configuration 2 is the conventional one, an adaptation can be only to TDD UL-DL configuration 5. Therefore, an indication for an adaptation for a TDD UL-DL configuration can be considered by UE 114 as invalid if, for example, it switches a DL TTI in the conventional TDD UL-DL configuration in an UL TTI. Invalid indications can be caused, by example, by the misdetection from UE 114 of a DCI format conveying an indication for an adapted TDD UL-DL configuration.

TABLE 4

Flexible TTIs (F) for TDD UL-DL configurations

| TDD UL-DL Configu-ration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

If eNB 102 can adapt a TDD UL-DL configuration more frequently than by RRC signaling, for example using physical layer signaling or MAC layer signaling, then flexible TTIs (which can be only UL TTIs in the conventional TDD UL-DL configuration) should not carry any periodic UL signaling from conventional UEs as this is configured by RRC signaling. This implies that in flexible TTIs conventional UEs should not be configured transmissions of SRS, or CSI, or SR, or HARQ-ACK signaling in response to SPS PDSCH. Additionally, if a reference TDD UL-DL configuration is used for HARQ-ACK signaling in response to dynamic PDSCH receptions, a respective UL TTI should not be a flexible TTI. However, there is a need for UE 114 to transmit SRS in UL flexible TTIs since, as it is further subsequently discussed, the interference experienced by a signal transmission from UE 114 can be different than in UL fixed TTIs and eNB 102 needs to obtain a respective UL CSI for UE 114 in a flexible TTI.

eNB 102 can signal an adapted TDD UL-DL configuration, for example, using a PDCCH that includes at least 3 bits for indicating a TDD UL-DL configuration from TABLE 2. The PDCCH can be transmitted either in UE 114-common space or in UE 114-dedicated space and in one or more predetermined TTIs. An adapted TDD UL-DL configuration remains valid over a predetermined number of TTIs. Typically, for a PDCCH intended for a group of UEs or for all UEs in a cell, there is no HARQ-ACK transmission from UE 114 to inform eNB 102 whether or not it detected the PDCCH. Consequently, for UE 114 that did not detect the PDCCH conveying an adapted TDD UL-DL configuration, communication with eNB 102 is compromised as UE 114 can have an incorrect understanding of a direction (DL or UL) for a flexible TTI, thereby failing to receive PDCCH scheduling PDSCH or PUSCH transmissions when it incorrectly assumes that a flexible TTI is an UL one and needlessly attempting to detect PDCCH when it incorrectly assumes that a flexible TTI is a DL one.

To establish a HARQ-ACK transmission timing that is independent from an adapted TDD UL-DL configuration, in order to avoid a missed detection of a respective PDCCH affecting HARQ-ACK transmission, eNB 102 can use higher layer signaling to inform UE 114 of a first TDD UL-DL reference configuration UE 114 can assume for transmitting HARQ-ACK signals and of a second TDD UL-DL reference configuration UE 114 can assume for receiving HARQ-ACK signals. For example, the first TDD UL-DL reference configuration can be configuration 5 while the second TDD UL-DL configuration can be configuration 0. Then, UE 114 always transmits HARQ-ACK signals in TTI #2 and receives HARQ-ACK signals in TTI #0 or TTI #5.

An advantage of using TDD UL-DL configuration 5 as a reference configuration for transmitting HARQ-ACK information from UE 114 and using TDD UL-DL configuration 0 as a reference configuration for receiving HARQ-ACK information by UE 114 is that UE 114 allows an adapted UL-DL TDD configuration to be any one from TABLE 2 subject to a restriction that TTIs indicated as DL ones in the conventional UL-DL TDD configuration are not changed to UL ones.

From TABLE 3, UE 114 can transmit HARQ-ACK information, in a same UL TTI, in response to PDSCH receptions in a number M of DL TTIs that is referred to as a bundling window with size M. A consequence of using UL-DL TDD configuration 5 as a reference one is that HARQ-ACK, P-CSI, or SR can only be transmitted in TTI #2. As TTI #2 can also be the only UL TTI where UE 114 transmits P-SRS, a multiplexing capacity of a PUCCH Format 3 can be further constrained by the puncturing of a last TTI symbol to accommodate P-SRS transmissions.

If UE 114 determines a HARQ-ACK payload assuming TDD UL-DL configuration 5, a total HARQ-ACK payload can be 18 bits, in case UE 114 is configured with a PDSCH transmission mode that conveys 2 data TBs, and UE 114 encodes the HARQ-ACK payload using dual RM coding (UE 114 generates HARQ-ACK information for every DL TTI regardless of whether it receives a DL DCI format in a DL TTI). A disadvantage of dual RM coding over single RM coding is a performance loss that exists when actual HARQ-ACK information includes less than 12 bits. Additionally, if UE 114 determines a HARQ-ACK payload associated with TDD UL-DL configuration 5 and also needs to multiplex P-CSI in a PUCCH Format 3 transmission, a total combined payload can exceed 22 bits that is a maximum payload that can be supported by PUCCH Format 3 in one RB. Then, HARQ-ACK spatial domain bundling needs to apply to result to a smaller HARQ-ACK payload. With HARQ-ACK spatial domain bundling, UE 114 generates an ACK only if both data TBs in a PDSCH are correctly received; otherwise UE 114 generates a NACK. A disadvantage of HARQ-ACK spatial domain bundling is that it results to a reduced DL throughput as UE 114 reports a NACK even when UE 114 correctly receives one of two data TBs in a PDSCH. Moreover, with or without HARQ-ACK bundling, if UE 114 also multiplexes in a PUCCH Format 3 a P-CSI for a fixed DL TTI or a P-CSI for a flexible DL TTI, a resulting total payload can be large thereby resulting to a high coding rate and worse reception reliability. The above reception reliability problems are further exacerbated if UE 114 is also configured for operation with DL Carrier Aggregation (CA) or Coordinated Multi-Point (CoMP) transmission as respective maximum payloads further increase since HARQ-ACK and P-CSI may need to be provided for each respective carrier or cell.

An UL DCI format scheduling a PUSCH transmission from UE 114 includes a field that consists of two bits and functions either as an UL Downlink Assignment Index (UL DAI) indicating to UE 114 a number of DL TTIs with respective PDSCH transmissions or SPS release that UE 114 should include HARQ-ACK information for in the PUSCH or, for TDD UL-DL configuration 0 (as a PDSCH transmission to UE 114 can only be scheduled in a same TTI as the PUSCH transmission to UE 114) as an UL index field indicating one or more UL TTIs for respective PUSCH transmissions (see also REF 2). A mapping of the UL DAI bits to a number of DL TTIs for UE 114 to include HARQ-ACK information in a respective PUSCH is given in TABLE 5. For a bundling window size M≥4, an UL DAI field maps to multiple numbers of DL TTIs and UE 114 can select one of them based on a number of detected PDCCHs (see also REF 3).

TABLE 5

Value of Downlink Assignment Index (DAI) in an UL DCI format

| DAI (MSB, LSB) | Number of TTIs with PDSCH transmission |
|---|---|
| 0, 0 | 1 or 5 or 9 |
| 0, 1 | 2 or 6 |
| 1, 0 | 3 or 7 |
| 1, 1 | 0 or 4 or 8 |

One likely combination of TDD UL-DL configurations used by UE 114 for reception and transmission of HARQ-ACK information are TDD UL-DL configuration 0 and TDD UL-DL configuration 5, respectively, because they allow a maximum flexibility in selecting an adapted TDD UL-DL configuration. The present disclosure assumes that the conventional TDD UL-DL configuration is assumed by UE 114 for reception of HARQ-ACK information and a TDD UL-DL configuration is configured by eNB 102 to UE 114 for determining UL subframes (and information payload) for HARQ-ACK transmission. However, TDD UL-DL configuration 0 may not be an adapted TDD UL-DL configuration and then, due to an absence of an UL DAI field in an UL DCI format, a HARQ-ACK payload UE 114 needs to multiplex in a PUSCH is determined by assuming that each DL ITT in a respective bundling window conveys a PDSCH. When TDD UL-DL configuration 5 is assumed by UE 114 for transmitting HARQ-ACK information, a bundling window size is 9 and a significant number of PUSCH resources, linearly scaling with a total HARQ-ACK payload (see also REF 2), may be needlessly used to transmit HARQ-ACK information as a number of PDCCHs UE 114 detects can be significantly smaller than 9.

When a PDCCH is used to convey an adapted TDD UL-DL configuration to UEs in a cell, such as for example a PDCCH conveying a DCI Format 1C (see also REF 2) transmitted in a UE-common space, it is possible that some UEs can be in a discontinuous reception mode (DRX mode) when the PDCCH is transmitted. Consequently, such UEs will not be aware of an adapted TDD UL-DL configuration and will have to operate using a possibly different TDD UL-DL configuration. This TDD UL-DL configuration can be one configured by higher layer signaling or the conventional one and then associated UEs can be scheduled as conventional UEs during a time period for an adapted TDD UL-DL configuration. Therefore, it is possible that UE 114 needs to transmit in a same PUCCH or PUSCH first HARQ-ACK information in response to PDSCH receptions scheduled with an adapted TDD UL-DL configuration and second HARQ-ACK information in response to PDSCH receptions scheduled with a non-adapted TDD UL-DL configuration.

A PUSCH transmission power in an UL flexible TTI can be different than in an UL fixed TTI as interference in the former may be from a combination of DL transmissions or UL transmissions in adjacent cells while interference in the latter is always from UL transmissions in adjacent cells. Two separate UL PC processes can be considered for UE 114; a first for use in UL fixed TTIs and in UL flexible TTIs where UE 114 experiences UL-dominant interference and a second for use in UL flexible TTIs where UE 114 experiences DL-dominant interference. Each UL PC process can have its own OLPC process or its own CLPC process, or both.

Figure 13:
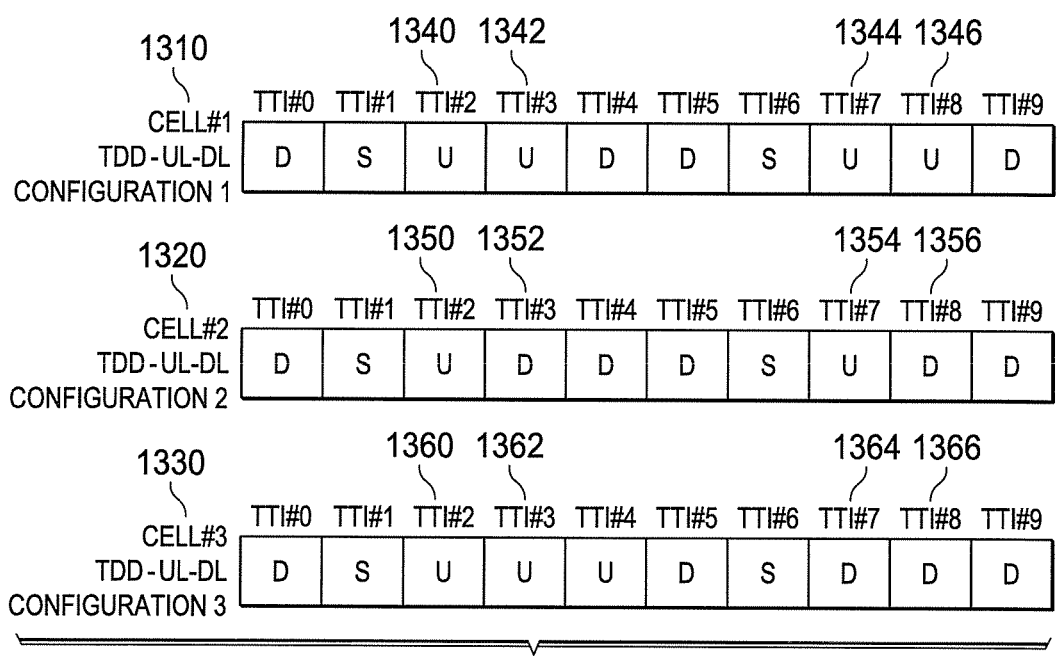
FIG. 13 illustrates an example of different interference characteristics in different flexible TTIs according to this disclosure.

FIG. 13 illustrates an example of different interference characteristics in different flexible TTIs according to this disclosure. The embodiments of the interference characteristics shown in different flexible TTIs shown in FIG. 13 are for illustration only. Other embodiments could be used without departing from the scope of the present disclosure.

As shown in FIG. 13, TDD UL-DL configuration 1 is used in reference cell #1 1310, TDD UL-DL configuration 2 is used in interfering cell #2 1320, and TDD UL-DL configuration 3 is used in interfering cell #3 1330. In fixed TTI #2 in cell #1 1340, cell #2 1350, and cell #3 1360, an interference experienced by UL transmissions is statistically same and a conventional UL PC process can apply. In flexible TTI #3 in cell #1 1342, an interference experienced by UL transmissions is different than in fixed TTI #2 as flexible TTI #3 is used for DL transmissions in cell #2 1352 and for UL transmissions in cell #3 1362. Therefore, UE 114 in cell #1 that is located towards cell #2 can experience significantly different interference in TTI #3 than in TTI #2. In flexible TTI #7 in cell #1 1344, an interference experienced by UL transmissions is different than in fixed TTI #2, or flexible TTI #3, as flexible TTI #7 is used for UL transmissions in cell #2 1354 and for DL transmissions in cell #3 1364. Therefore, UE 114 in cell #1 that is located towards cell #3 can experience significantly different interference than an interference experienced in TTI #2 or in TTI #3. Finally, in flexible TTI #8 in cell #1 1346, an interference experienced by UL transmissions is different than in fixed TTI #2, or in flexible TTI #3, or in flexible TTI #7, as flexible TTI #8 is used for DL transmissions in both cell #2 1356 and cell #3 1366. Therefore, not only there exists interference variation between the two TTI types (fixed and flexible) but also there exists interference variation in different flexible TTIs.

A consequence of larger interference variations in an UL flexible TTI relative to a UL fixed TTI is that a reception reliability of data TBs transmitted in a PUSCH in a flexible UL TTI can be worse than the one of data TBs transmitted in a PUSCH is a fixed UL TTI. This is not a serious issue for transmissions of data TBs that can benefit from HARQ retransmissions but it is a serious issue for UCI transmissions in the PUSCH which have stricter reliability requirements and cannot benefit for HARQ retransmissions. For UCI transmissions in the PUCCH, a reference TDD UL-DL configuration can be used so that UCI in the PUCCH is always transmitted in UL fixed TTIs.

A consequence of UL-dominant interference in a flexible DL TTI is that a separate interference measurement and CSI report is needed relative to a CSI report for fixed DL TTIs or for a flexible DL TTI with DL-dominant interference. Therefore UE 114 should support at least two CSI processes for channel measurements (using a CSI-RS) and for interference measurements (using two respective CSI-IMs).

From TABLE 3 it is observed that when different UEs have different understanding of a TDD UL-DL configuration, a respective bundling window size is also different and therefore an index of a same DL TTI within a respective bundling window is different. As UE 114 determines a PUCCH resource for transmitting a HARQ-ACK signal in response to a PDSCH reception from an index of a respective DL TTI in a bundling window, this can lead to a PUCCH resource collision where two or more different UEs use a same PUCCH resource to transmit respective HARQ-ACK signals. A remedy is for eNB 102 to configure separate PUCCH resources to be used for each TDD UL-DL configuration (conventional or adapted one) but this can significantly increase PUCCH overhead.

Figure 14:
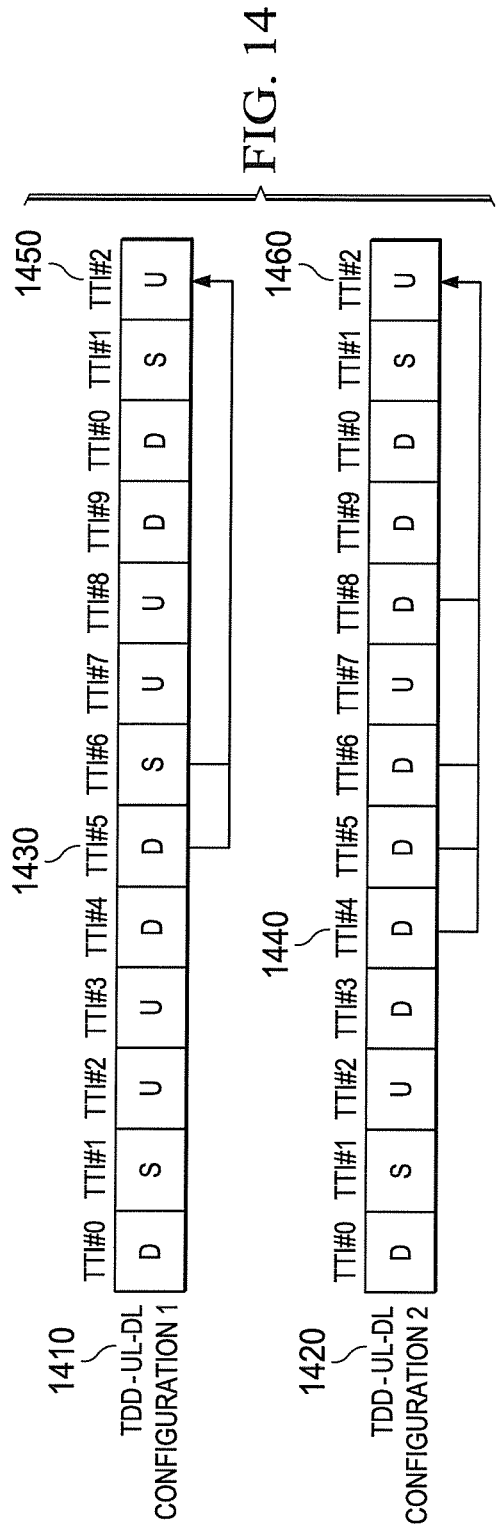
FIG. 14 illustrates example HARQ-ACK transmissions in a same UL TTI for 2 different TDD UL-DL configurations according to this disclosure.

FIG. 14 illustrates example HARQ-ACK transmissions in a same UL TTI for 2 different TDD UL-DL configurations according to this disclosure. The embodiments of the HARQ-ACK transmissions shown in FIG. 14 are for illustration only. Other embodiments could be used without departing from the scope of the present disclosure.

As shown in FIG. 14, TDD UL-DL configuration 1 (bundling window size of M=2) is a conventional one 1410 and the TDD UL-DL configuration 1 is adapted to TDD UL-DL configuration 2 (bundling window size of M=4) 1420. Then, TTI #5 1430 for a conventional UE and TTI #4 1440 for UE 114 supporting adaptive TDD UL-DL configuration have a same index in respective bundling windows. If all other parameters in respective PUCCH resource determination functions are same, a conventional UE receiving PDSCH in TTI #5 and UE 114 supporting adaptive TDD UL-DL configuration receiving PDSCH in TTI #4 will use a same PUCCH resource in TTI #2 1450 for respective HARQ-ACK signaling, thereby leading to colliding PUCCH resources and unreliable receptions of HARQ-ACK signals.

Embodiments of this disclosure provide mechanisms for supporting UCI transmissions, and particularly HARQ-ACK transmissions, from UE 114 configured for operation with an adaptive TDD UL-DL configuration. Embodiments of this disclosure provide a mechanism for avoiding resource collisions between a transmission of HARQ-ACK information from LTE 114 configured to operate with an adaptive TDD UL-DL configuration and a transmission of HARQ-ACK information from UE 114 operating with a non-adapted TDD UL-DL configuration signaled by a system information block when both UE transmit HARQ-ACK information using PUCCH Format 1b with HARQ-ACK multiplexing. Embodiments of this disclosure also provide mechanisms for UE 114 to determine TTIs that are available for UCI multiplexing in a PUSCH depending on a UCI type and for accordingly interpreting fields of a DCI format scheduling a PUSCH transmission from UE 114 in a TTL Moreover, embodiments of this disclosure provide a mechanism to extend a size for a UCI payload that can be supported using PUCCH Format 3. Furthermore, embodiments of this disclosure provide mechanisms for UE 114 and eNB 102 to operate when UE 114 cannot detect a PDCCH conveying a DCI format adapting a TDD UL-DL configuration and eNB 102 is aware of such event. Additionally, embodiments of this disclosure provide mechanisms for UE 114 to inform eNB 102 of an actual of missed detection for a PDCCH conveying a DCI format indicating an adapted TDD UL-DL configuration to a group of UEs. Finally, embodiments of this disclosure provide mechanisms for eNB 102 to use and for UE 114 configured for operation with an adapted TDD UL-DL configuration to interpret a field in a DCI format scheduling a PUSCH transmission as either an UL DAI field or as an UL index field when TDD UL-DL configuration 0 is the conventional one and assumed for operation by UE 114 when it misses a PDCCH conveying a DCI format informing of an adapted TDD UL-DL configuration.

Resources for PUCCH Format 1a/1b with HARQ-ACK Multiplexing for a UE Configured for Operation with Adaptive TDD UL-DL Configuration In certain embodiments, recognizing that only UL TTIs in a conventional TDD UL-DL configuration can be flexible TTIs, it becomes apparent that any adaptation of a conventional TDD UL-DL configuration can only have more DL TTIs (and less UL TTIs). Therefore, a bundling window size $M_{adapt}$ corresponding to DL TTIs for which HARQ-ACK is reported for an adapted TDD UL-DL configuration is larger than or equal to a bundling window size $M_{SI}$ corresponding to a conventional TDD UL-DL configuration, that is $M_{adapt} \geq M_{SI}$. Then, PUCCH resource collisions for a HARQ-ACK signal transmission from a conventional UE operating with a conventional TDD UL-DL configuration and a HARQ-ACK signal transmission from UE 114 operating with an adapted TDD UL-DL configuration can occur in a same UL TTI as it was previously described based on Equation 1.

In a first approach, aforementioned PUCCH resource collisions (in a same UL TTI) can be avoided by re-indexing DL TTIs that are in a bundling window of size $M_{adapt}$ but are not in a bundling window of size $M_{S1}$ (needed only if $M_{adapt} > M_{SI}$—transmissions of respective HARQ-ACK signals are assumed to be in a same UL TTI). The DL TTIs in a bundling window of size $M_{adapt}$ are a super-set of the DL TTIs in a bundling window of size $M_{SI}$. This re-indexing is possible because UE 114, which supports adaptation of a TDD UL-DL configuration, knows both a conventional TDD UL-DL configuration and the number of TTIs for which HARQ-ACK needs to be reported when operating with an adapted TDD UL-DL configuration. Therefore, UE 114 knows the DL TTIs in a bundling window of size $M_{adapt}$ that are not included in DL TTIs in a bundling window of size $M_{SI}$.

An indexing of DL TTIs for determination of respective PUCCH resources for HARQ-ACK signal transmissions is such that DL TTIs determined from a conventional TDD UL-DL configuration and additional DL TTIs corresponding to operation with an adapted TDD UL-DL configuration, that are not included in the conventional TDD UL-DL configuration, are indexed in their original order after DL TTIs determined from the conventional TDD UL-DL configuration. Denoting by $L_{adapt}=\{l_0, l_1, \ldots l_{M_{adapt}-1}\}$ a set of indexes of TTIs in a frame belonging to a bundling window of size $M_{adapt}$ and by $K_{SI}=\{k_0, k_1, \ldots K_{M_{SI}-1}\}$ the indexes of TTIs in a frame belonging to a bundling window of size $M_{SI}$, with $K_{SI}$ being a subset of $L_{adapt}$, the set $L_{adapt}$ is divided into two subsets $L_{adapt}^{SI}$ and $L_{adapt}^{NSI}$ having no common elements where $L_{adapt}^{SI}$ is identical to $K_{SI}$ and $L_{adapt}^{NSI}$ contains all indexes of TTIs in $L_{adapt}$ that are not in $K_{SI}$. Then, two bundling windows can be formed, where the first bundling window has size $M_{SI}$ and the second bundling window has size $M_{NSI}=M_{adapt}-M_{SI}$ both having HARQ-ACK signal transmissions in a same UL TTI, with a first one including all TTIs in subset $L_{adapt}^{SI}$ and the second including all TTIs in subset $L_{adapt}^{NSI}$. PUCCH resources are first allocated for HARQ-ACK signal transmissions associated with TTIs in the first bundling window and are subsequently allocated or HARQ-ACK signal transmissions associated with TTIs in the second bundling window. Therefore, in case of PDCCH, Equation 1a is modified as in Equation 2a1

$$n_{PUCCH}=(M_{SI}-m-1)\cdot N_c+m\cdot N_{c+1}+n_{CCE,n-k_m}+N_{PUCCH}^{(1)} \qquad (2a1)$$

for TTIs with indexes in $L_{adapt}^{SI}=K_{SI}$ and as in Equation 2a2

$$n_{PUCCH} = (M_{NSI} - m - 1)\cdot N_c + m\cdot N_{c+1} + n_{CCE,n-k_m} + N_{PUCCH}^{(1)} + \sum_{l=0}^{M_{SI}-1} N_{CCE,l} \qquad (2a2)$$

for TTIs with indexes in $L_{adapt}^{NSI}$ where $N_{CCE,l}$ is a total number of CCEs in TTI l of $L_{adapt}^{SI}$. Therefore, for the TDD UL-DL configuration UE 114 is configured by eNB 102 for HARQ-ACK signal transmission, although the determination of $M_{adapt}$ and of UL TTIs for HARQ-ACK signal transmission is according to TABLE 3, the ordering of the HARQ-ACK information bits transmitted in a same UL TTI is first for the DL or special TTIs that are in $M_{SI}$ and then for DL TTIs that are in $M_{NSI}$.

In case of EPDCCH, a PUCCH resource $n_{PUCCH}$ for a HARQ-ACK signal transmission, in response to a detection of a respective PDCCH in a TTI with index j in a frame and with index m in a bundling window, can be determined as in Equation 1 if j is an element of $L_{adapt}^{SI}$ (m is in first bundling window). If j is an element of $L_{adapt}^{NSI}$ (m is in second bundling window), it adapt can be determined as in Equation 2 where the notation is same as in Equation 1.

$$n_{PUCCH} = n_{ECCE,n-k_m} + \sum_{j=0}^{m-1} N_{ECCE,n-k_j} + \sum_{l=0}^{M_{SI}-1} N_{ECCE,n-k_l} + f(HRO) + N_{PUCCH}^{(e1)} \qquad (2)$$

Figure 15:
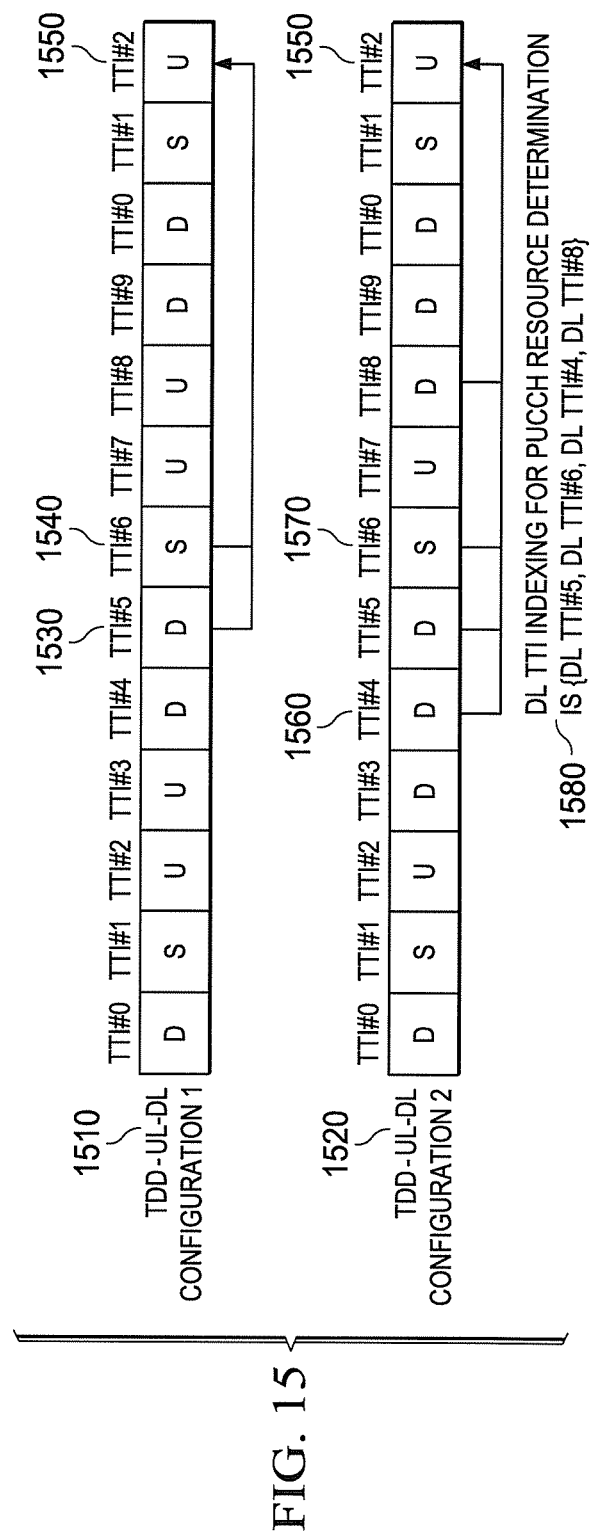
FIG. 15 illustrates an example indexing of DL TTIs in an adapted TDD UL-DL configuration, relative to a conventional TDD UL-DL configuration, for determining PUCCH resources for respective HARQ-ACK signal transmissions according to this disclosure.

FIG. 15 illustrates an example indexing of DL TTIs in an adapted TDD UL-DL configuration, relative to a conventional TDD UL-DL configuration, for determining PUCCH resources for respective HARQ-ACK signal transmissions according to this disclosure. The embodiment of the indexing shown in FIG. 15 is for illustration only. Other embodiments could be used without departing from the scope of the present disclosure.

As shown in FIG. 15, if TDD UL-DL configuration 1 (bundling window size of $M_{SI}$=2) is a conventional one 1510 and the TDD UL-DL configuration 1 is adapted to TDD UL-DL configuration 2 (bundling window size of $M_{adapt}$=4) 1520 and HARQ-ACK transmission timing is based on TDD UL-DL configuration 2, then DL TTI #5 1530 and DL TTI #6 1540 are indexed first for determining PUCCH resources for respective HARQ-ACK transmissions in UL TTI #2 1550. In general, DL TTIs in a conventional TDD UL-DL configuration are indexed first using DL association indexing in TABLE 3. DL TTI #4 1560 and DL TTI #8 1570 are then sequentially indexed after DL TTI #5 and DL TTI #6. Therefore, for PUCCH resource determination in UL TTI #2, a DL TTI indexing for the adapted TDD UL-DL configuration 2 is {DL TTI #5, DL TTI #6, DL TTI #4, DL TTI #8} 1580 instead of a conventional indexing of {DL TTI #4, DL TTI #5, DL TTI #8, DL TTI #6} indicated in TABLE 3 (for TDD UL-DL configuration 2). Therefore, UE 114 configured to operate with an adapted TDD UL-DL configuration also operates with a modified DL association indexing where HARQ-ACK information for the flexible SFs is placed sequentially after the HARQ-ACK information for DL fixed SFs according to a TDD UL-DL configuration used for UL HARQ-ACK transmissions by UEs configured to operate with an adapted TDD UL-DL configuration.

In a second approach, the aforementioned PUCCH resource collisions can be avoided by using a different $N_{PUCCH}$ value for PUCCH resources associated with DL TTIs included in an adapted TDD UL-DL configuration but not included in a conventional TDD UL-DL configuration. This is particularly applicable in case of PDCCH as in case of EPDCCH the ARO field can be used as a PUCCH resource offset.

With the second approach, a conventional method for PUCCH resource determination as described by Equation 1 or by Equation 1a is used but, similar to the first approach, a bundling window of size $M_{adapt}$ for an adapted TDD UL-DL configuration is split into two bundling windows (both with HARQ-ACK signal transmission in a same first UL TTI). A first bundling window of size $M_{SI}$ contains TTIs with respective HARQ-ACK signal transmissions in the same first UL TTI that are included in the conventional TDD UL-DL configuration. A second bundling window of size $M_{NSI}=M_{adapt}-M_{SI}$ contains TTIs with respective HARQ-ACK signal transmissions in a same first UL TTI that are not included in the conventional TDD UL-DL configuration. Additionally, UE 114 determines a PUCCH resource for a HARQ-ACK signal transmission in response to a PDSCH reception (or SPS release) using a first configured PUCCH resource offset $N_{PUCCH,1}$ if a respective TTI is in the first bundling window and using a second configured PUCCH resource offset $N_{PUCCH}^{(2)}$ if a respective TTI is in the second bundling window. Therefore, Equation 2a2 for TTIs in the second bundling window is modified as $n_{PUCCH}=(M_{NSI}-m-1)\cdot N_c+m\cdot N_{c+1}+n_{CCE,n-k_m}+N_{PUCCH}^{(2)}$. Both the first and second PUCCH resource offsets, $N_{PUCCH}^{(1)}$ and $N_{PUCCH}^{(2)}$, can be informed to UE 114 by eNB 102 through SIB signaling or through higher layer signaling. For example, $N_{PUCCH}^{(1)}$ can be informed as described in REF3 and REF4 and $N_{PUCCH}^{(2)}$ can be configured to UE 114 by higher layer signaling. Alternatively, only $N_{PUCCH}^{(1)}$ is informed to UE 114 and $N_{PUCCH}^{(2)}$ is implicitly determined from $N_{PUCCH}^{(1)}$. Alternatively, $N_{PUCCH}^{(2)}=N_{PUCCH}^{(2)}+$offset where offset is informed to UE 114 by eNB 102 using higher layer signaling. Therefore, a PUCCH resource corresponding to a TTI in the first bundling window or to a TTI in the second bundling window can be determined as in Equation 1 (in case of EPDCCH) or Equation 1a (in case of PDCCH) wherein $N_{PUCCH}^{(1)}$ is used for the first bundling window and $N_{PUCCH}^{(2)}$ is used for the second bundling window.

In case of EPDCCH, eNB 102 can use the same values of $N_{PUCCH}^{(1)}$ and $N_{PUCCH}^{(2)}$ or even not explicitly configure $N_{PUCCH}^{(2)}$ in which case $N_{PUCCH}^{(1)}$ is always used. Then, as the first min ($M_{SI}$, $M_{NSI}$) TTIs use a same set of PUCCH resources, collisions can be avoided by eNB 102 choosing an appropriate ARO value. In that case different ARO mapping functions can be used for TTIs in the first bundling window, $f_1(ARO)$, and for TTIs in the second bundling window, $f_2(ARO)$. Within a same bundling window, it is possible for a UE to detect a PDCCH in a first TTI and an EPDCCH in a second TTI.

FIG. 16 illustrates an example determination of a PUCCH resource for HARQ-ACK signal transmission using a PUCCH resource offset depending on a DL TTI index of a respective PDSCH reception in an adapted TDD UL-DL configuration according to this disclosure. The embodiment shown in FIG. 16 is for illustration only. Other embodiments could be used without departing from the scope of the present disclosure.

As shown in FIG. 16, TDD UL-DL configuration 1 (bundling window size of $M_{SI}=2$) is a conventional one and it is adapted to TDD UL-DL configuration 2 (bundling window size of $M_{adapt}=4$) 1610 and HARQ-ACK transmission timing is based on TDD UL-DL configuration 2. For DL TTI #5 1620 and DL TTI #6 1630 (included in TDD UL-DL configuration 1), a respective PUCCH resource in UL TTI #2 1640 for a HARQ-ACK signal transmission from UE 114 in response to a respective PDSCH reception (or SPS release) is determined using a first PUCCH resource offset $N_{PUCCH}^{(1)}$ 1650. For DL TTI #4 1660 and DL TTI #8 1670 (not included in PUCCH TDD UL-DL configuration 1), a respective PUCCH resource in UL TTI #2 1640 for a HARQ-ACK signal transmission from UE 114 in response to a respective PDSCH reception (or SPS release) is determined using a second PUCCH resource offset $N_{PUCCH}^{(2)}$ 1680 which can be either explicitly signaled to UE 114 or can be implicitly determined by UE 114 from $N_{PUCCH}^{(1)}$. Therefore, UE 114, configured for operation with an adapted TDD UL-DL configuration, can use two offsets for determining resources to transmit HARQ-ACK information in an UL TTI using PUCCH Format 1b with HARQ-ACK multiplexing. For determination of resources corresponding to TTIs that are the same as TTIs for which a UE operating with a conventional TDD UL-DL configuration transmits HARQ-ACK information in the UL TTI, a first offset is used. For determination of resources corresponding to TTIs that are different than TTIs for which a UE operating with a conventional TDD UL-DL configuration transmits HARQ-ACK information in the UL TTI, a second offset is used.

In a third approach, the aforementioned PUCCH resource collisions can be avoided by using a different PUCCH resource determination method for DL TTIs that are not included in a conventional TDD UL-DL configuration.

Similar to the first approach or the second approach, a bundling window of size $M_{adapt}$ corresponding to transmission of HARQ-ACK information from UE 114 configured with an adapted TDD UL-DL configuration is split into two bundling windows (both with HARQ-ACK signal transmission in a same first UL TTI). A first bundling window of size $M_{SI}$ contains TTIs with respective HARQ-ACK signal transmissions in a same first UL TTI that are included in a conventional TDD UL-DL configuration. A second bundling window of size $M_{NSI}=M_{adapt}-M_{SI}$ contains TTIs with respective HARQ-ACK signal transmissions in the same first UL TTI that are not included in the conventional TDD UL-DL configuration. A conventional method for PUCCH resource determination as described by Equation 1 (in case of EPDCCH) or Equation 1a (in case of PDCCH) is used for TTIs in the first bundling window.

For TTIs in the second bundling window, a PUCCH resource can be explicitly indicated from a set of PUCCH resources that were previously configured to UE 114 by higher layer signaling (at least for DL TTIs occurring earlier than a first DL TTI in a conventional TDD UL-DL configuration). Either same or different PUCCH resources can be configured by higher layer signaling for different DL TTIs. The indication of a PUCCH resource can be through an ARO field in a DCI format scheduling a respective PDSCH (or SPS release). For example, for an ARO field including 2 bits, one from four configured PUCCH resources can be indicated. Typically, as a number of DL TTIs included in the second bundling window is less than four, a same set of respective PUCCH resources can be used for all such DL TTIs if an ARO field of 2 bits is used to indicate 4 PUCCH resources. Unlike a determination of PUCCH resource corresponding to a TTI in the first bundling window for which ARO acts as an offset to an implicitly determined resource by UE 114 (Equation 1), for a determination of PUCCH resource corresponding to a TTI in the second bundling window the ARO can instead directly index a PUCCH resource as $n_{PUCCH}=g(HRO)$ where g(HRO) is an index to a PUCCH resource from one of at most four PUCCH resources configured to UE 114 by eNB 102 through higher layer signaling in accordance to the third approach. In case transmitter diversity is supported for HARQ-ACK signal transmissions, g(HRO) is an index to a pair of PUCCH resources.

FIG. 17 illustrates an example implicit or explicit determination of a PUCCH resource for HARQ-ACK signaling depending on whether or not a respective DL TTI index is included in a conventional TDD UL-DL configuration, respectively, according to this disclosure. As shown in FIG. 17, it is assumed that TDD UL-DL configuration 1 is the conventional one indicated to conventional UEs and it is adapted to TDD UL-DL configuration 2 1710 and HARQ-ACK transmission timing is based on TDD UL-DL configuration 2. For DL TTI #5 1720 and DL TTI #6 1730 (included in TDD UL-DL configuration 1), a respective PUCCH resource in UL TTI #2 1760 for a HARQ-ACK signal transmission from UE 114 in response to a respective PDSCH reception (or SPS release) is determined using a same method as for conventional UEs (method 1) 1722 and 1732, for example as in Equation 1. For DL TTI #4 1740 and DL TTI #8 1750 (not included in TDD UL-DL configuration 1), a respective PUCCH resource in UL TTI #2 1760 for a HARQ-ACK signal transmission from UE 114 in response to a respective PDSCH reception (or SPS release) is determined using a different method (method 2) 1742 and 1752. This different method can be explicit indication of a PUCCH resource, from a set of PUCCH resources configured to UE 114 by higher layer signaling, using the ARO field in a DCI format scheduling the PDSCH (or a SPS release) in a respective DL TTI.

TTI-Dependent UCI Multiplexing in a PUSCH

In certain embodiments, a first method for improving a detection reliability of UCI multiplexed in a PUSCH is to link this multiplexing with an UL PC process used for the PUSCH transmission. If the UL PC process is the one used for PUSCH transmissions in a first set of TTIs, such as UL fixed TTIs (will be referred to as first UL PC process), UE 114 multiplexes UCI in the PUSCH. If the UL PC process is same as the one used for PUSCH transmissions in a second set of TTIs, such as UL flexible TTIs (will be referred to as second UL PC process), UE 114 does not multiplex UCI in the PUSCH. UE 114 can determine the UL PC process to apply for a PUSCH transmission either explicitly from a respective field included in a DCI format scheduling a PUSCH transmission or by configuration for a respective TTI in a frame or implicitly from a value of a field included in a DCI format scheduling a PUSCH transmission and also providing a different functionality (for example, a field indicating a CS and possibly an OCC for a DMRS transmission in a PUSCH where odd values can be also associated with a first UL PC process and even values can be associated with a second UL PC process). UCI can include HARQ-ACK or P-CSI or their combination.

Figure 18:
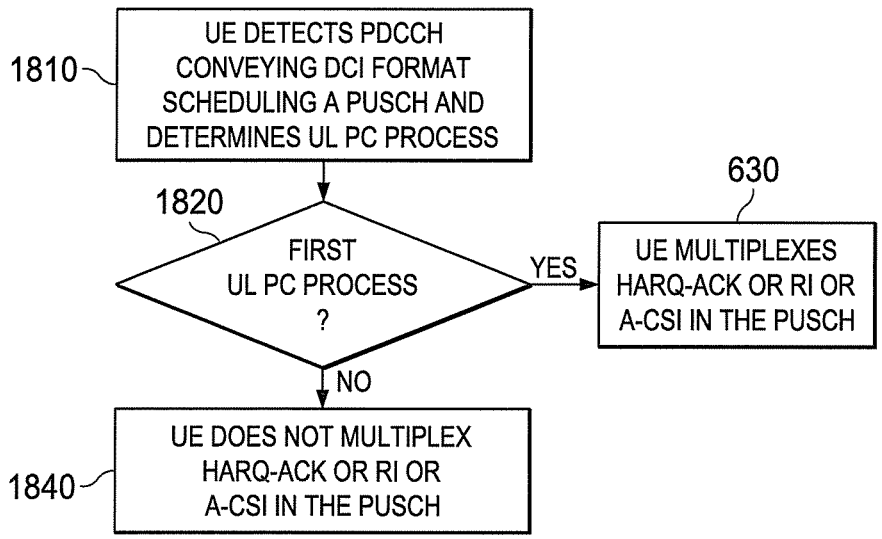
FIG. 18 illustrates an example determination by a UE whether to multiplex UCI in a PUSCH depending on an associated UL PC process according to this disclosure.

FIG. 18 illustrates an example determination by UE 114 whether to multiplex UCI in a PUSCH depending on an associated UL PC process according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 18, UE 114 detects a PDCCH conveying a DCI format scheduling a PUSCH in an UL TTI and determines a respective UL PC in operation 1810. UE 114 is also assumed to have either HARQ-ACK or P-CSI to multiplex in the PUSCH. UE 114 examines whether the UL PC process is a first process or a second process in operation 1820. If the UL PC process for determining the PUSCH transmission power is the first process, UE 114 multiplexes HARQ-ACK or P-CSI in the PUSCH in operation 1830; otherwise, if the UL PC process for determining the PUSCH transmission power is the second process, UE 114 does not multiplex HARQ-ACK or P-CSI in the PUSCH in operation 1840.

In a second method, for HARQ-ACK or P-CSI multiplexing in a PUSCH, this multiplexing is entirely prohibited, regardless of the UL PC process used for the PUSCH transmission, unless the PUSCH is transmitted in a same TTI as a PUCCH UE 114 would use to transmit the HARQ-ACK or P-CSI when UE 114 does not have any PUSCH transmission. If UE 114 does not transmit a UCI in the PUSCH, subsequent actions can depend on the UCI type. For HARQ-ACK transmission, UE 114 can proceed in a same manner as when UE 114 does not have a PUSCH transmission and transmit the HARQ-ACK in a PUCCH.

Figure 19:
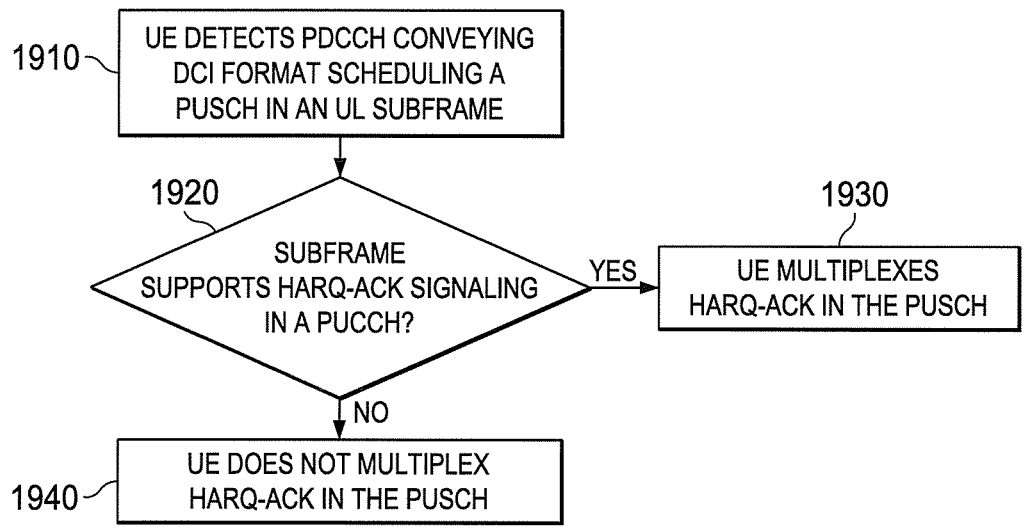
FIG. 19 illustrates an example determination by a UE whether to multiplex UCI in a PUSCH depending on a respective TTI according to this disclosure.

FIG. 19 illustrates an example determination by UE 114 whether to multiplex UCI in a PUSCH depending on a respective TTI according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 19, UE 114 detects a PDCCH conveying a DCI format scheduling a PUSCH in an UL TTI in operation 1910. UE 114 subsequently determines whether the UL TTI is an UL TTI where UE 114 can transmit HARQ-ACK or P-CSI in a PUCCH in operation 1920. If the UL TTI supports HARQ-ACK or P-CSI transmission from UE 114 in a PUCCH, UE 114 multiplexes HARQ-ACK or P-CSI in the PUSCH in operation 1930; otherwise, if the UL TTI does not support HARQ-ACK or P-CSI transmission from UE 114 in a PUCCH, UE 114 does not multiplex HARQ-ACK or P-CSI in the PUSCH in operation 1940. For example, a TTI supporting HARQ-ACK signal transmission in a PUCCH can be an UL fixed TTI and a TTI not supporting HARQ-ACK signal transmission in a PUCCH can be an UL flexible TTI.

An UL DAI field included in a DCI format scheduling a PUSCH and indicating a number of PDSCHs for which UE 114 should multiplex HARQ-ACK in the PUSCH is not useful when HARQ-ACK is not multiplexed in the PUSCH. Utilization of the 2-bit UL DAI field in that case can be by either always setting the 2-bit UL DAI field to zero, so that UE 114 can check its value when determining whether the validity of the fields in a detected DCI format, or by using the 2-bit UL DAI field as an additional TPC field in order to increase a number of TPC bits used by the CLPC component of the second UL PC process and enhance an accuracy of the second UL PC process, or for any other functionality related to PUSCH transmissions.

Figure 20:
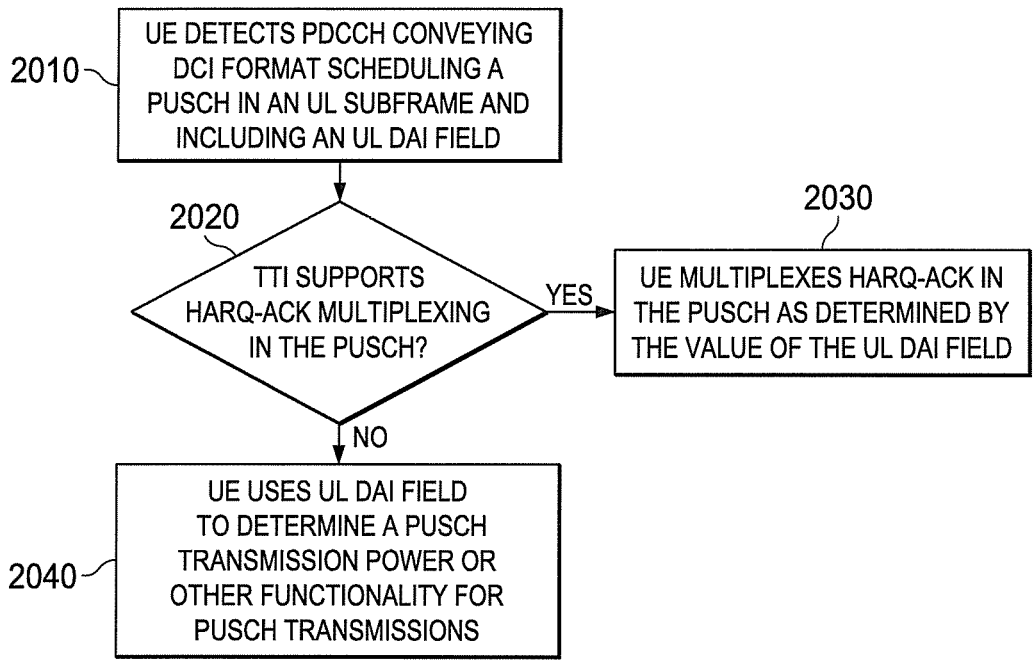
FIG. 20 illustrates an example use of an UL DAI field included in a DCI format scheduling a PUSCH transmission in a TTI depending on whether or not a UE multiplexes HARQ-ACK in the PUSCH in the TTI according to this disclosure.

FIG. 20 illustrates an example use of an UL DAI field included in a DCI format scheduling a PUSCH transmission in a TTI depending on whether or not UE 114 multiplexes HARQ-ACK in the PUSCH in the TTI according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 20, UE 114 detects a PDCCH conveying a DCI format scheduling a PUSCH in an UL TTI and including an UL DAI field in operation 2010. UE 114 subsequently determines whether the UL TTI is an UL TTI where UE 114 can multiplex HARQ-ACK in the PUSCH in operation 2020, for example using one of the previously described methods. If the UL TTI supports HARQ-ACK signal transmission from UE 114 in the PUSCH, UE 114 determines an HARQ-ACK payload to multiplex in the PUSCH according to a value of the UL DAI field in operation 2030; otherwise, if the UL TTI does not support HARQ-ACK signal transmission from UE 114 in the PUSCH, UE 114 uses the UL DAI field to complement a TPC field included in the DCI format in order to increase a number of TPC bits for closed-loop power control of the PUSCH transmission and enhance a respective reception reliability in operation 2040. Alternatively, the UL DAI field value can be set to a predetermined value such as '00' that UE 114 can confirm before further considering the DCI format as valid. Alternatively, the UL DAI field value can be used for any other functionality related to PUSCH transmissions.

In case HARQ-ACK is multiplexed in a PUSCH only when the PUSCH is transmitted in a same TTI as a PUCCH UE 114 would use for transmitting HARQ-ACK information when it does not transmit a PUSCH, the effective bundling window $M_{adapt}$ is different than a conventional one $M_{SI}$ as it was previously described. A mapping of an UL DAI field should also reflect an effective bundling window size $M_{adapt}$.

Unlike potential resource collisions for transmission of HARQ-ACK information using PUCCH format 1b with channel selection between UE 114, configured to operate with an adapted TDD UL-DL configuration, and UE 115, operating with a conventional TDD UL-DL configuration as it was previously described, such collisions do not occur when HARQ-ACK information is transmitted in a PUSCH. Therefore, for UE 114 configured to operate with an adaptive TDD UL-DL configuration, the ordering of HARQ-ACK information does not need to be modified by placing first HARQ-ACK information bits corresponding to a first set of TTIs and placing second HARQ-ACK information bits corresponding to a second set of TTIs. Instead, the ordering of HARQ-ACK information bits for respective TTIs is according to the timing described in TABLE 3 for a TDD UL-DL configuration that is configured to UE 114 for transmission of HARQ-ACK information.

Figure 21:
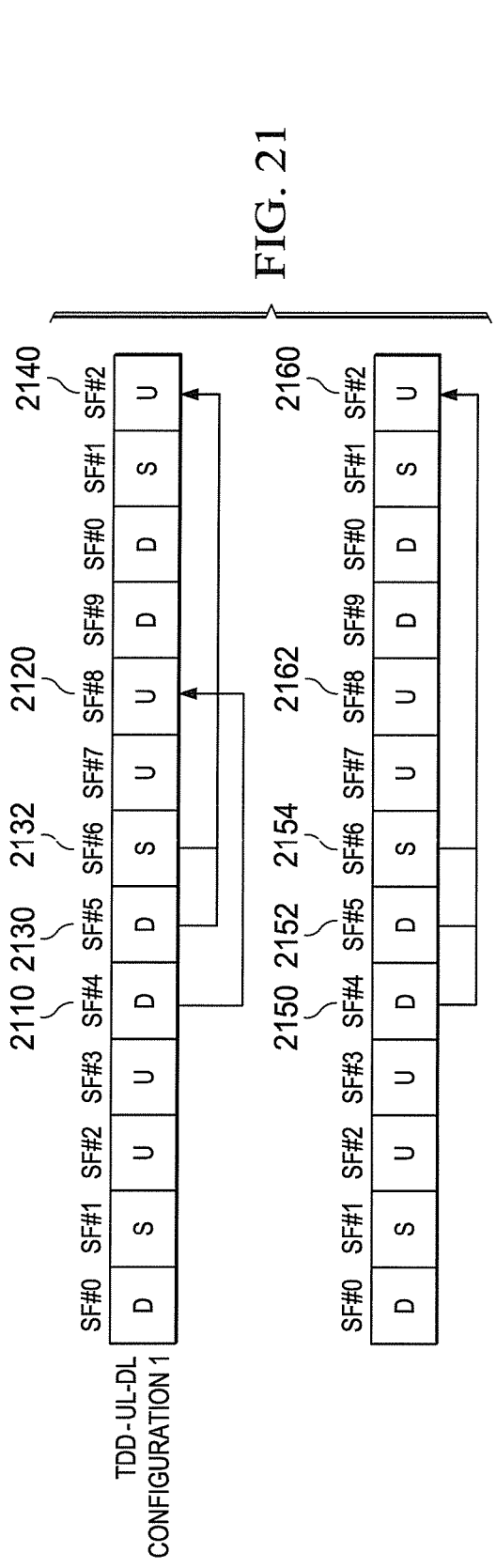
FIG. 21 illustrates an effective bundling window size if HARQ-ACK is only multiplexed in a PUSCH of predetermined UL TTIs according to this disclosure.

FIG. 21 illustrates an example effective bundling window size if HARQ-ACK is only multiplexed in a PUSCH of predetermined UL TTIs according to this disclosure. The embodiment of the PUSCH shown in FIG. 21 is for illustration only. Other embodiments could be used without departing from the scope of the disclosure.

As shown in FIG. 21, TDD UL-DL configuration 1 is used (bundling window size of $M_{SI}=2$) for illustration purposes only. In a conventional use of an UL DAI field, when eNB 102 schedules a PDSCH transmission to UE 114 in SF #4 2110, eNB 102 expects a respective HARQ-ACK transmission from UE 114 in SF #8 2120. Therefore, when eNB 102 schedules PUSCH transmission to UE 114 in SF #8, an UL DAI field with a value of 1 in a respective DCI format indicates that UE 114 shall multiplex HARQ-ACK for a PDSCH transmission (or SPS release) in SF #4. Similar, when eNB 102 schedules a PDSCH transmission to UE 114 in either or both of SF #5 2130 and SF #6 2132, eNB 102 expects a respective HARQ-ACK transmission from UE 114 in SF #2 2140 and when eNB 102 schedules PUSCH transmission to UE 114 in SF #2, an UL DAI field with a value of 1 or 2, respectively, in a respective DCI format indicates the number of PDSCHs (or SPS release) for which UE 114 shall multiplex HARQ-ACK in the PUSCH. Assuming that SF #8 2162 is an UL flexible TTI, UE 114 does not support HARQ-ACK multiplexing in a PUSCH transmission in SF #8. Then, eNB 102 expects UE 114 to multiplex HARQ-ACK for a PDSCH scheduled in SF #4 in the first TTI after SF #8 where UE 114 can transmit HARQ-ACK in a PUCCH. In the exemplary case of TDD UL-DL configuration 1, that UL TTI is SF #2. Therefore, when eNB 102 schedules a PDSCH transmission to UE 114 in either of SF #4 2150, SF #5 2152 and SF #6 2154, eNB 102 expects a respective HARQ-ACK transmission from UE 114 in SF #2 2160 and when it schedules PUSCH transmission to UE 114 in SF #2, an UL DAI field with a value of 1 or 2 or 3, depending on whether a number of PDSCH (or SPS release) scheduled in SF #4, SF #5, and SF #6 is respectively, 1 or 2 or 3, in a respective DCI fonnat indicates a number of PDSCHs for which UE 114 shall multiplex HARQ-ACK in the PUSCH. Therefore, for UE 114 configured to operate with an adapted TDD UL-DL configuration, a mapping for values of an UL DAI field is according to a configured TDD UL-DL configuration UE 114 considers in determining UL TTIs available for transmission of HARQ-ACK.

For A-CSI, if a transmission does not occur in a respective PUSCH, the transmission cannot occur in a subsequent PUCCH as a respective A-CSI payload cannot be supported by a PUCCH format used to transmit P-CSI and UE 114 may have another A-CSI to transmit in a next PUSCH transmission. Therefore, for A-CSI, two alternatives can exist.

A first alternative is to always transmit A-CSI in a PUSCH. As an A-CSI codeword is assumed to also include a CRC, eNB 102 can determine if it incorrectly decodes an A-CSI codeword. If the PUSCH transmission uses the second UL PC process, the A-CSI resources in the PUSCH can be larger than respective ones for a same PUSCH transmission using the first UL PC process. Therefore, multiplexing of UCI in a PUSCH can be further conditioned on the UCI type with HARQ-ACK or P-CSI not multiplexed in the PUSCH, under previously described conditions, while A-CSI is always multiplexed in a PUSCH when a respective A-CSI request field in a DCI format scheduling the PUSCH transmission indicates that UE 114 shall multiplex A-CSI in its PUSCH transmission.

Figure 22:
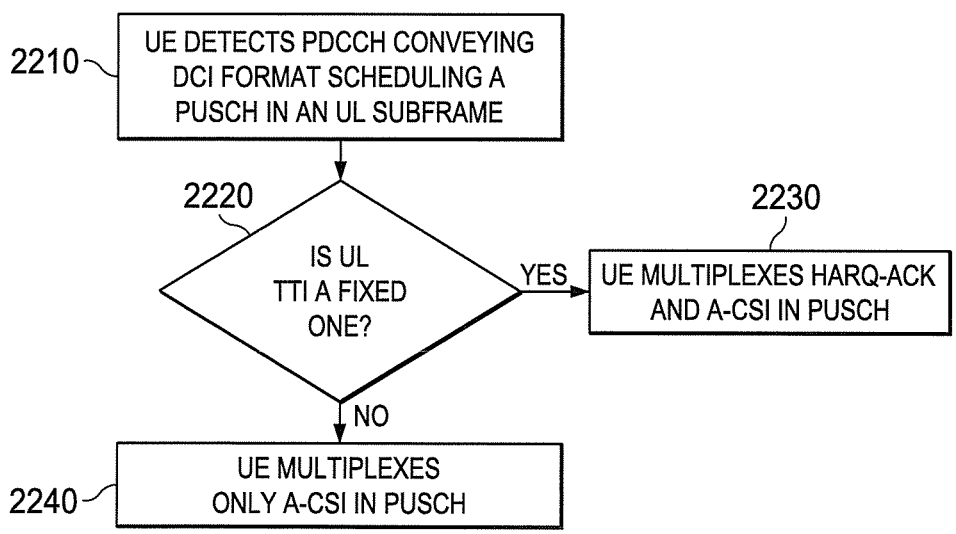
FIG. 22 illustrates an example UE decision for multiplexing UCI in a PUSCH transmitted in a TTI according to a UCI type and the TTI type according to this disclosure.

FIG. 22 illustrates an example UE decision for multiplexing UCI in a PUSCH transmitted in a TTI according to a UCI type and the TTI type according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 22, UE 114 detects a PDCCH conveying a DCI format scheduling a PUSCH in an UL TTI an including an UL DAI field in operation 2210. UE 114 subsequently determines whether the UL TTI is an UL fixed TTI, or an UL TTI using a first UL PC process, where PUCCH can be transmitted as it was previously described in operation 2220. If the UL TTI is a UL fixed TTI (or an UL TTI where UE 114 can transmit HARQ-ACK in a PUCCH, or an UL TTI using a first UL PC process), UE 114 multiplexes HARQ-ACK and A-CSI in the PUSCH in operation 2230; otherwise, if the UL TTI is not an UL fixed TTI (or an UL TTI where UE 114 cannot transmit HARQ-ACK in a PUCCH, or an UL TTI using a second UL PC process), UE 114 multiplexes only A-CSI in the PUSCH in operation 2240.

A second alternative is for UE 114 to always drop A-CSI transmission in a PUSCH that uses a second UL PC process or if the PUSCH transmission is in an UL TTI where PUCCH transmissions are not supported for UE 114. In that case, the 1-bit A-CSI request field that is included in a DCI format scheduling the PUSCH is not used. Utilization of the 1-bit A-CSI request field in that case can be by either always setting the 1-bit A-CSI request field to zero, so that UE 114 can check its value when determining whether the validity of the fields in a detected DCI format, or by using the 1-bit A-CSI request field as a TPC bit in order to increase a number of TPC bits used by the CLPC component of the second UL PC process and enhance an accuracy of the second UL PC process, or by using it for any other functionality related to PUSCH transmissions. UE 114 behavior in this case is similar as the one described for the UL DAI field in FIG. 20.

Finally, although the previous descriptions of the various aspects of the first embodiment of the disclosure considered a PUSCH scheduled by a DCI format in a detected PDCCH, a same UE behavior (when applicable) can exist when a PUSCH retransmission is triggered by a PHICH detection. SPS PUSCH is assumed to be in UL fixed TTIs and UE 114 can follow conventional methods for multiplexing UCI in a SPS PUSCH.

UCI Multiplexing in a PUCCH for a UE Configured for Operation with Adaptive TDD UL-DL Configuration Certain embodiments consider multiplexing of two P-CSI reports in a same PUCCH. This is motivated from a need to support reporting from UE 114 of a first P-CSI corresponding a DL fixed TTI and of at least a second P-CSI corresponding to a DL flexible TTI and from a limitation of UL TTIs where a PUCCH can exist for P-CSI reporting (for example, only in UL fixed TTIs). It is assumed that UE 114 cannot simultaneously transmit UCI in two different PUCCHs.

UE 114 can be configured by eNB 102 a first set of DL or special TTIs for determining a first CSI and a second set of DL or special TTIs for determining a second CSI where the configuration can be by using a bit-map of 9 bits to include a maximum of TTIs in a TDD UL-DL configuration that can be DL or special TTIs (TTI #2 is always an UL TTI). For example a bit-map can be {0 0 1 1 0 0 1 1 0} where a value of '0' indicates a TTI in the first set and a value of '1' indicates a TTI in the second set. Alternatively, a bit-map can be defined in a same manner relative to the DL or special TTIs of a TDD UL-DL configuration eNB 102 configures to UE 114 for determining one or more UL TTIs for transmission of HARQ-ACK information.

As a P-CSI difference between a DL fixed TTI and a DL flexible TTI is in a respective interference experienced for DL receptions by UE 114, a single PMI suffices for both P-CSI reports and either the P-CSI for a DL flexible TTI or the P-CSI for a DL fixed TTI does not need to include a PMI. Therefore, a P-CSI reporting mode (defining whether PMI is multiplexed (see also REF 3)) can be configured separately for a first set of TTIs, such as a set of DL fixed TTIs, and for a second set of TTIs, such as a set of DL flexible TTIs. This is applicable regardless of whether Time Division Multiplexing (TDM) is used for transmissions of a first P-CSI and a second P-CSI so that they can occur in different UL TTIs or whether these two P-CSIs are multiplexed in a same PUCCH (and in a same UL TTI). Moreover, UE 114 can compute a PMI only in a first set of TTIs or in a second set of TTIs or combine a PMI computation using at least a TTI from the first set of TTI and at least a TTI from the second set of TTIs.

It is therefore beneficial to support multiplexing in a same PUCCH of two CQIs, corresponding to two different sets of TTIs that are configured to UE 114 by eNB 102, and of a single PMI corresponding to both DL TTI sets, such as a set of DL fixed TTIs and a set of DL flexible TTIs. It is also possible, according to a configuration of a CSI reporting type to UE 114, for the P-CSI report to include only the two CQIs for the respective two sets of TTIs.

Figure 23:
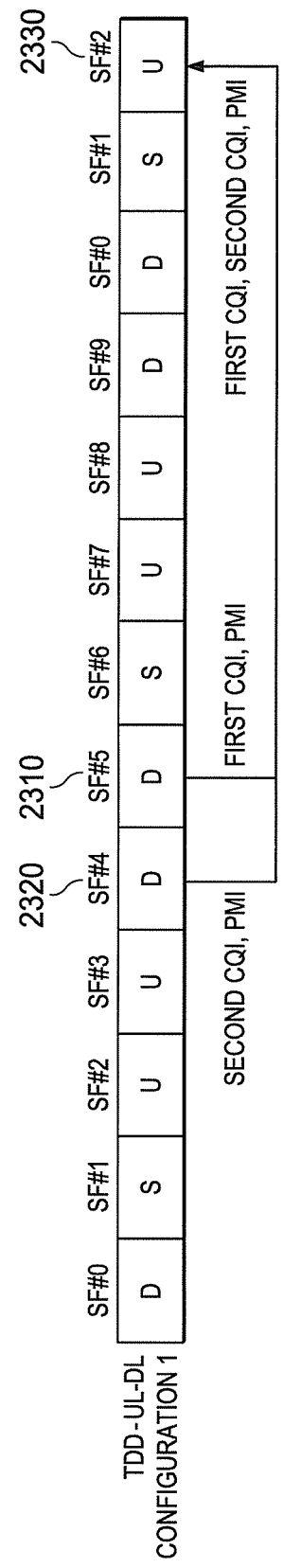
FIG. 23 illustrates an example multiplexing in a same PUCCH of a first CQI corresponding to a first set of TTIs, of second CQI corresponding to a second set of TTIs, and of a single PMI corresponding to both sets of TTIs according to this disclosure.

FIG. 23 illustrates an example multiplexing in a same PUCCH of a first CQI corresponding to a first set of TTIs (such as a set of DL fixed TTIs), of a second CQI corresponding to a second set of TTIs (such as DL flexible TTIs), and of a single PMI corresponding to both sets of TTIs according to this disclosure. The embodiment of the TDD configuration 2300 shown in FIG. 23 is for illustration only. Other embodiments could be used without departing from the scope of the disclosure.

As shown in FIG. 23, a TDD UL-DL configuration 1 is used for illustration purposes only. UE 114 computes a first P-CQI in a DL fixed TTI SF #5 2310 and computes a second P-CQI in a DL flexible TTI SF #4 2320 and a single PMI, in either or both DL fixed TTI SF #5 and DL flexible TTI SF #4, and reports the first P-CQI, the second P-CQI, and the PMI in a PUCCH in UL TTI SF #2 2330.

As the second CQI is likely to be better (higher) than the first CQI, since DL transmissions in a DL flexible TTI can experience UL-dominant interference (that is typically smaller than DL-dominant interference experienced by DL transmissions in a DL fixed TTI), the second CQI can be reported in a differential manner to the first CQI with most values indicating a higher CQI. For example, the second CQI can be represented by 2 binary elements, instead of 4 binary elements used to indicate the first CQI, and the 2 binary elements can be used to indicate one smaller and three larger indexes for the second CQI compared to the index of the first CQI. Therefore, a second CQI for a second set of subframes can include a second set of values where at least one value in the second set of values is larger than the largest value in a first set of values, such as the set in TABLE 1, for a first CQI for a first set of subframes.

In a first example, for a differential reporting of a second CQI relative a to a first CQI using two binary elements, a first value can indicate an index that is two values smaller (when applicable) than an index of the first CQI and second, third, and fourth values can be same, two values larger, and four values larger than the index of the first CQI, respectively. Then, referring to TABLE 1, for a first CQI value indicating an index 4, the second CQI value can indicate a CQI index of 2, 4, 6, or 8. In a second example, for the second CQI, a first value can indicate an index that is same as an index for the first CQI and second, third, and fourth values can be two values larger, four values larger, and six values larger (when applicable, if the largest possible value is not reached), respectively, than the index of the first CQI. Then, referring to TABLE 1, for a first CQI value indicating an index 4, the second CQI value can indicate either a CQI index of 4, 6, 8, or 10. In case of reporting more than two P-CSIs, remaining P-CSIs can be provided in a same manner as it was previously described for the second P-CSI.

Moreover, UE 114 can be configured with a different PDSCH transmission mode in a DL fixed TTI and in a DL flexible TTI including support of different modulation schemes. For example, in a first set of TTIs, such as DL fixed TTIs, a PDSCH transmission can be configured to use a first transmission mode or a maximum modulation order of 64 Quadrature Amplitude Modulation (QAM) while in a second set of TTIs, such as DL flexible TTIs, UE 114 can be configured to use a second PDSCH transmission mode or a maximum modulation order of 256QAM. Therefore, in the first set of TTIs, TABLE 1 and TABLE 1A can be used, while in the second set of TTIs, eNB 102 can configure UE 114 to use either TABLE 1 and TABLE 1A or a modified TABLE 1 and a modified TABLE 1A that include support for 256QAM modulation.

Instead of using a same PUCCH format for multiplexing both a P-CSI for a first set of DL TTIs and a P-CSI for a second set of DL TTIs as the PUCCH format used to transmit a single P-CSI (also referred as PUCCH Format 2, see also REF 1), the multiplexing of the two P-CSIs can be in a PUCCH format (PUCCH Format 3) with structure such as the one described in FIG. 7. Additionally, multiplexing of HARQ-ACK and of previous 2 P-CSIs can be supported by a same PUCCH format such as the one described in FIG. 7.

Figure 24:
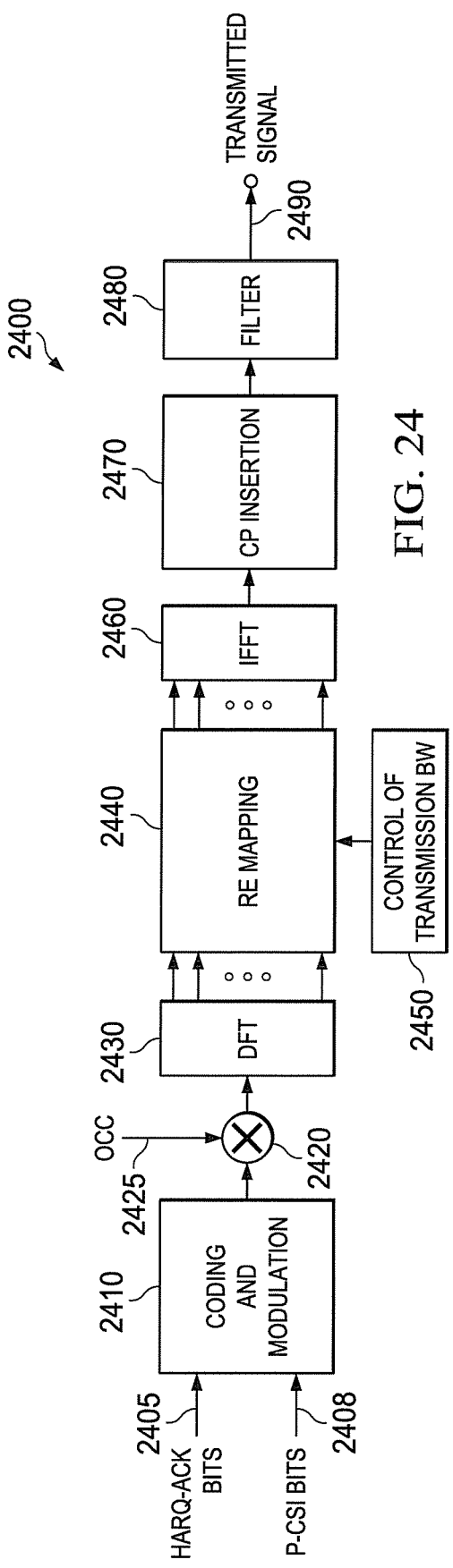
FIG. 24 illustrates an example UE transmitter block diagram for HARQ-ACK, P-CSI for a first set of TTIs, and P-CSI for a second set of TTIs according to this disclosure.

FIG. 24 illustrates an example UE transmitter block diagram for HARQ-ACK, P-CSI for a first set of TTIs, and P-CSI for a second set of TTIs according to this disclosure. The embodiment of the UE transmitter 2400 shown in FIG. 24 is for illustration only. Other embodiments could be used without departing from the scope of the present disclosure. In certain embodiments, the UE transmitter 2400 is located in the UE 114.

As shown in FIG. 24, assuming the structure in FIG. 7, UE 114 transmitter encodes and modulates 2410 HARQ-ACK bits 2405 and P-CSI bits 2408 and multiplies the encoded and modulated bits with an element of an OCC 2425 for a respective TTI symbol 2420. The P-CSI bits include a PMI and a CQI for a DL fixed TTI and a CQI for a DL flexible TTI. After DFT precoding 2430, UE 114 transmitter selects REs 2440 of a PUCCH RB 2450, applies an IFFT 2460, inserts a CP 2470, applies filtering 2480, and transmits the signal 2490.

Figure 25:
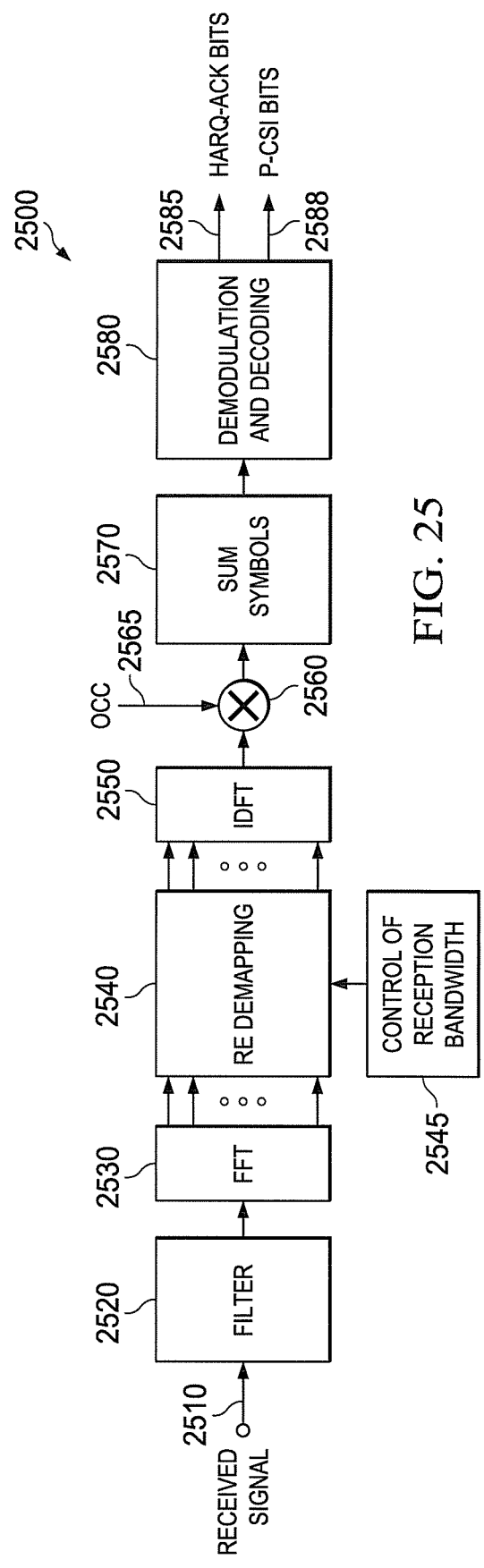
FIG. 25 illustrates an example eNB receiver block diagram for HARQ-ACK, P-CSI for a first set of TTIs, and P-CSI for a second set of TTIs according to this disclosure.

FIG. 25 illustrates an example eNB receiver block diagram for HARQ-ACK, P-CSI for a first set of TTIs, and P-CSI for a second set of TTIs according to this disclosure. The embodiment of the eNB receiver 2500 shown in FIG. 25 is for illustration only. Other embodiments could be used without departing from the scope of the disclosure. In certain embodiments, the eNB receiver 2500 is located in eNB 102.

As shown in FIG. 25, eNB 102 receiver filters 2520 a received signal 2510, applies a FFT 2530, selects 2545 REs 2540 used by UE 114 transmitter, applies an IDFT 2550, multiplies 2560 with an OCC element 2565 for a respective symbol, sums outputs for symbols conveying HARQ-ACK signals and P-CSI signals 2570, and demodulates and decodes summed HARQ-ACK signals and P-CSI signals 2580 to obtain transmitted HARQ-ACK bits 2585 and P-CSI bits 2588.

As an interference experienced by a PDSCH transmission to UE 114 depends on whether a respective DL TTI is a fixed one or a flexible one, with the interference typically being smaller for the latter if a respective TTI in a dominant interfering cell in an UL one, a different PDSCH transmission rank can apply between PDSCH transmissions in DL fixed TTI and in DL flexible TTI with the rank for the latter being same to or larger than the rank for the former. Therefore, UE 114 can provide a separate RI for a DL fixed TTI and for a DL flexible TTI. Similar to a P-CSI for a DL flexible TTI, a respective RI can be provided in a differential manner. For example, only 1 bit can be used for an RI report for a DL flexible TTI indicating whether a same rank or an immediately higher rank can apply for a PDSCH transmission in a DL flexible TTI. For example, if an RI report for a DL fixed TTI consists of 2 bits indicating a PDSCH transmission rank of 1, 2, or 4 spatial layers and a RI value indicates 1 spatial layer, a RI report for a DL flexible TTI can consist of 1 bit indicating a PDSCH transmission rank of either 1 spatial layer or 2 spatial layers. As a TDD UL-DL configuration can remain valid for only a limited number of TTIs, UE 114 may need to report RI for a DL flexible TTI within a validity period of a TDD UL-DL configuration. Given a limited number of UL TTIs where such an RI report can be transmitted, it becomes beneficial to enable multiplexing of RI and P-CSI reports in a same PUCCH. Therefore, embodiments of the present disclosure further consider UE 114 supporting adaptation of a TDD UL-DL configuration, an RI report for a DL fixed TTI and a RI report for a DL flexible TTI can be multiplexed in a same PUCCH and can also be multiplexed together with a P-CSI report for a DL fixed TTI or for a DL flexible TTI.

Extending Payload Support for PUCCH Format 3

In certain embodiments, UE 114 configured for operation with an adaptive TDD UL-DL configuration can use a PUCCH Format 3 that can be configured to be transmitted over one RB or over multiple RBs depending on a UCI payload.

UE 114 can be configured to transmit a PUCCH Format 3 over 2 RBs, for example at least when TDD UL-DL configuration 5 is configured to UE 114 for determining TTIs for which UE 114 needs to provide HARQ-ACK information or at least when UE 114 transmits P-CSI together with HARQ-ACK. By using 2 RBs, instead of 1 RB, for a transmission of a PUCCH Format 3, a respective resource overhead doubles but UCI payloads that can be supported with target reception reliability also practically double. In general, varying a number of RBs used for a PUCCH Format 3 transmission allows for scalability in a transmitted UCI payload for similar reception reliability, without dropping any UCI or applying excessive HARQ-ACK bundling, while maintaining a PUCCH Format 3 structure and maintaining a single PUCCH transmission from UE 114 in an UL TTI.

Figure 26:
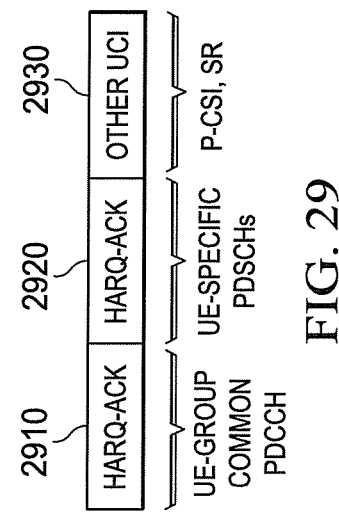
FIG. 26 illustrates an example resource allocation for PUCCH Format 3 depending on a maximum total payload according to this disclosure.

FIG. 26 illustrates an example resource allocation for PUCCH Format 3 depending on a maximum total payload according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 26, UE 114 determines a total UCI payload in operation 2610 to transmit in a PUCCH. This determination can be semi-static by configuration as UE 114 is configured a P-CSI reporting mode and is configured a TDD UL-DL configuration for HARQ-ACK transmissions. The UCI includes HARQ-ACK, P-CSI, or SR. For HARQ-ACK, UE 114 determines a payload from a configured PDSCH transmission mode (based on whether a PDSCH can convey one data TB or two data TBs), from a number of DL TTIs in a TDD UL-DL configuration assumed for HARQ-ACK transmission in case of operation in a TDD system, or from a number of configured DL carriers in case UE 114 operates with DL CA. If a UCI payload $O_{UCI}$ does not exceed a predetermined threshold in operation 2620, such as for example 22 bits, a PUCCH Format 3 over one RB in operation 2630 can be configured to UE 114 by eNB 102 and UCI encoding can be by a first RM code, such as a (32, $O_{UCI}$) RM code punctured to a (24, $O_{UCI}$). If the UCI payload exceeds the threshold, a PUCCH Format 3 over two RBs in operation 2640 can be configured to UE 114 by eNB 102 and UCI encoding can be with a second RM code, such as a (64, $O_{UCI}$) RM code punctured to a (48, $O_{UCI}$) RM code or a dual (24, $O_{UCI}$) RM code where each (24, $O_{UCI}$) RM code is applied over 1 RB. Alternatively, a convolutional code instead of a RM code can be used when UE 114 transmits UCI over two RBs. For example, when UE 114 transmits HARQ-ACK without P-CSI, a payload may not exceed the predetermined threshold while when UE 114 transmits HARQ-ACK and P-CSI, a payload can exceed the predetermined threshold. UE 114 can therefore have a first PUCCH Format 3 resource configured for the first UCI payload case and a second PUCCH Format 3 configured for the second UCI payload case.

If a dual (24, $O_{UCI}$) RM code (with QPSK modulation) is used over 2 RBs, with each (24, $O_{UCI}$) RM code applied over 1 RB, it is possible to multiplex in a same RB a transmission of a PUCCH Format 3 from a first UE 114 transmitting in only 1 RB and a transmission of a PUCCH Format 3 from a second UE 115 transmitting in 2 RBs. Moreover, when UE 114 determines a PUCCH Format 3 transmission over 2 RBs (based on a respective determined UCI payload), UE 114 interprets an indication of a respective resource in a DL DCI format as being applicable over 2 RBs; otherwise, if UE 114 determines a PUCCH Format 3 transmission over 1 RB, UE 114 interprets an indication of a respective resource in a DL DCI format as being applicable over 1 RB.

Figure 27:
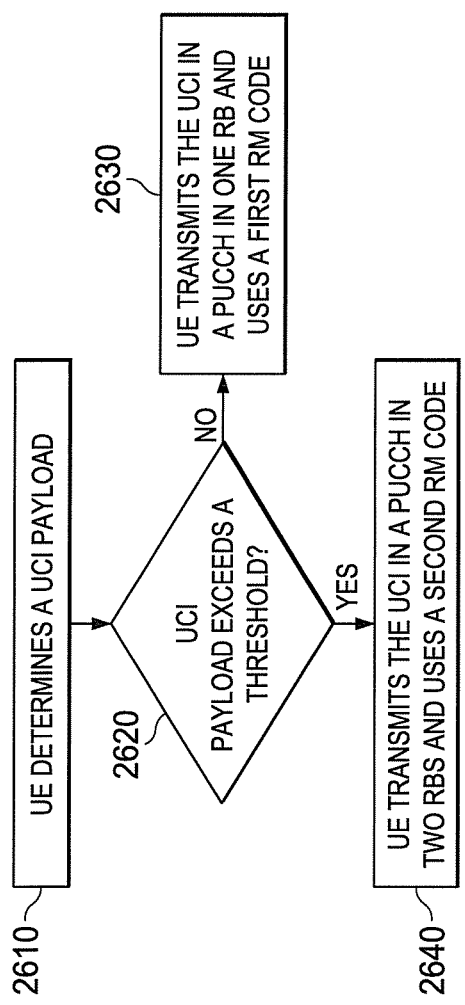
FIG. 27 illustrates an example PUCCH Format 3 transmission over 2 RBs according to this disclosure.

FIG. 27 illustrates an example PUCCH Format 3 transmission over 2 RBs according to this disclosure. The example of the PUCCH Format 3 transmission shown in FIG. 27 is for illustration only. Other embodiments could be used without departing from the scope of the disclosure.

As shown in FIG. 27, in a first realization, UE 114 splits $O_{UCI}$ information bits in a first RM code and in a second RM code in an alternating manner, for example by placing even-indexed (starting from 0) UCI bits to the first RM code and odd-indexed UCI bits to the second RM code. $\lceil O_{UCI}/2 \rceil$ UCI bits are then placed in the first (24, $\lceil O_{UCI}/2 \rceil$) RM code 2710 and $\lfloor O_{UCI}/2 \rfloor$ UCI bits are placed in the second (24, $\lfloor O_{UCI}/2 \rfloor$) RM code 2720 where $\lceil \ \rceil$ is the ceiling function rounding a number to its immediately higher integer and $\lfloor \ \rfloor$ is the floor function rounding a number to its immediately lower integer. UE 114 transmits, using QPSK modulation and a PUCCH Format 3 structure in each RB of two RBs, 24 encoded UCI bits from a first RM code in a first RB 2715 and 24 encoded UCI bits from a second RM code in a second RB 2725. In a second realization, encoded and modulated bits of a first (24, $\lceil O_{UCI}/2 \rceil$) RM code 2730 and of a second (24, $\lceil O_{UCI}/2 \rceil$) RM code 2740 are placed in REs of 2 RBs in an alternating manner 2735, 2745. In a third realization, UE 114 encodes $O_{UCI}$ bits using a single (48, $O_{UCI}$) RM code 2750 and transmits, using QPSK modulation and PUCCH Format 3 structure, the encoded and modulated UCI bits over 2 RBs 2760.

Missed Detection of a PDCCH Conveying a DCI Format Adapting a TDD UL-DL Configuration In certain embodiments, UE 114 operating with an adapted TDD UL-DL configuration does not detect a PDCCH indicating a new adapted TDD UL-DL configuration and eNB 102 that transmitted the PDCCH is aware of that event. For example, eNB 102 can be aware that UE 114 is in a DRX mode in a TTI of the PDCCH transmission.

When UE 114 operating with an adapted TDD UL-DL configuration does not detect a PDCCH indicating a new adapted TDD UL-DL configuration, UE 114 then can operate with a conventional TDD UL-DL configuration, or with a known to UE 114 TDD UL-DL configuration such as a previously configured TDD UL-DL configuration (possibly separate for DL reception and for UL transmissions), or attempt to detect PDCCH in every TTI (except TTI #2) and follow a respective DL or UL scheduling assignment (if any), until UE 114 later detects another PDCCH indicating a new adapted TDD UL-DL configuration. However, in case UE 114 operates with a non-adapted TDD UL-DL configuration, UE 114 may not behave according to the non-adapted TDD UL-DL configuration with respect to its HARQ-ACK transmissions as there can be residual HARQ-ACK information corresponding to PDCCH detections during a last adapted TDD UL-DL configuration that UE 114 needs to transmit in a TTI occurring after a last TTI of the last adapted TDD UL-DL configuration.

To address the above problem, certain embodiments of this disclosure consider that a UE, such as UE 114, operating with an adapted TDD UL-DL configuration and does not detect a PDCCH indicating a new adapted TDD UL-DL configuration, continues to transmit HARQ-ACK information using a same reference TDD UL-DL configuration, such as for example TDD UL-DL configuration 5, as when UE 114 operates with an adapted TDD UL-DL configuration. Even through DL or UL scheduling purposes, UE 114 operates with a conventional TDD UL-DL configuration after a last TTI of a current adapted TDD UL-DL configuration. The use of the previous reference TDD UL-DL configuration can be always applicable or can be restricted only to the first UL TTI of a non-adapted TDD UL-DL configuration. Moreover, the eNB 102 receiver can use this knowledge to improve detection reliability of a HARQ-ACK codeword by assuming that UE 114 places a NACK/DTX value in the HARQ-ACK codeword at each location corresponding to a DL TTI that is an UL TTI in the conventional TDD UL-DL configuration. Additionally, to improve detection reliability of a HARQ-ACK codeword transmitted using a PUCCH Format 3, UE 114 can rearrange the order of DL TTIs as it was described in the first embodiment of the disclosure by placing first HARQ-ACK information corresponding to DL fixed TTIs and placing second HARQ-ACK information corresponding to DL flexible TTIs (that are UL TTIs in the conventional TDD UL-DL configuration) as the former can convey actual HARQ-ACK information while the latter can convey only NACK/DTX.

Figure 28:
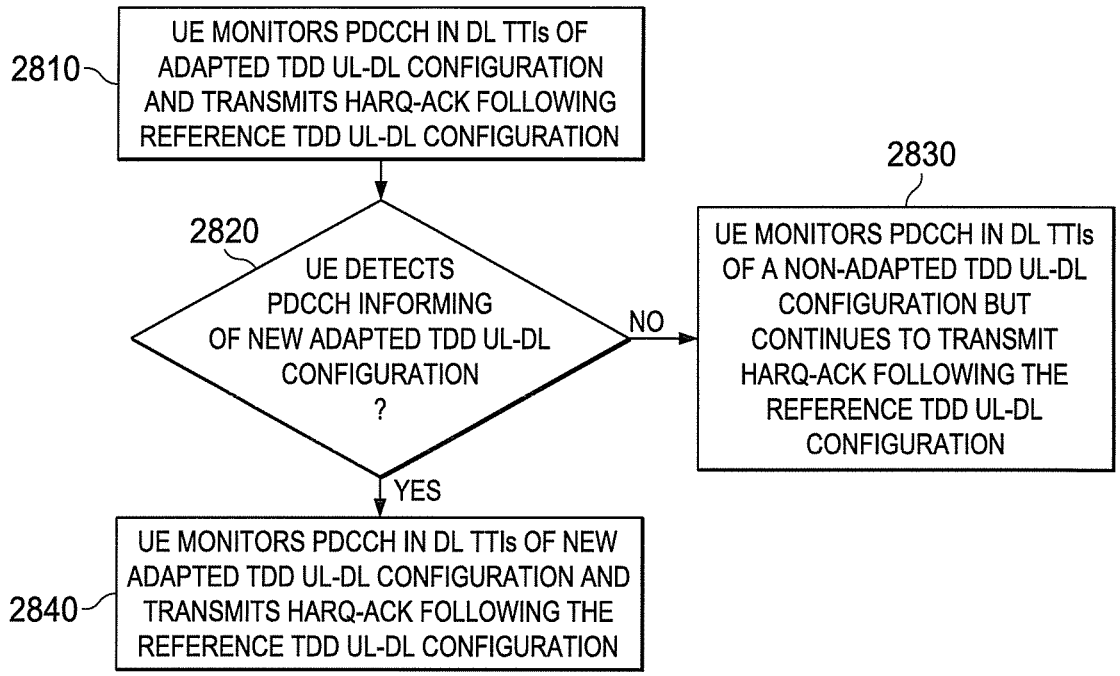
FIG. 28 illustrates an example DL or UL scheduling and HARQ-ACK transmission for a UE operating with an adapted TDD UL-DL configuration followed by operation with a conventional TDD UL-DL configuration according to this disclosure.

FIG. 28 illustrates an example DL or UL scheduling and HARQ-ACK transmission for UE 114 operating with an adapted TDD UL-DL configuration followed by operation with a conventional TDD UL-DL configuration according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 28, while UE 114 operates with an adapted TDD UL-DL configuration, UE 114 monitors PDCCH in DL TTIs of the adapted TDD UL-DL configuration and transmits HARQ-ACK information following a reference TDD UL-DL configuration in operation 2810. After a last TTI of an adapted TDD UL-DL configuration, as determined by UE 114 from a known validity period of the adapted TDD UL-DL configuration, UE 114 determines whether it has detected a PDCCH informing of a new adapted TDD UL-DL configuration in operation 2820. If it has not, UE 114 monitors PDCCH in DL TTIs of a conventional TDD UL-DL configuration or in every TTI other than TTI #2, but continues to transmit HARQ-ACK information following the reference TDD UL-DL configuration in operation 2830. If it has, UE 114 monitors PDCCH in DL TTIs of the new adapted TDD UL-DL configuration and transmits HARQ-ACK information following the reference TDD UL-DL configuration in operation 2840.

The present embodiment can be modified in case UE 114 does not detect a PDCCH informing of an adapted TDD UL-DL configuration over one or more validity periods of an adapted TDD UL-DL configuration. A validity period can include a number of TTIs or a number of frames. When there is no residual HARQ-ACK information corresponding to an adapted TDD UL-DL configuration, UE 114 can transmit HARQ-ACK information according to the non-adapted TDD UL-DL configuration. Therefore, UE 114 can determine a HARQ-ACK payload and an UL TTI for HARQ-ACK signal transmission, as described in TABLE 3, according to the non-adapted TDD UL-DL configuration. UE 114 can also use a first PUCCH format to transmit HARQ-ACK information associated with an adapted TDD UL-DL configuration and use a second PUCCH format to transmit HARQ-ACK information associated with a non-adapted TDD UL-DL configuration, where the first PUCCH format can be different than the second PUCCH format.

Finally, when UE 114 operates with a non-adapted TDD UL-DL configuration followed by an adapted TDD UL-DL configuration, HARQ-ACK transmission in a first UL TTI of the adapted TDD UL-DL configuration can be according to a same method as for the non-adapted TDD UL-DL configuration, including a determination of a HARQ-ACK payload and a use of a PUCCH format for the HARQ-ACK transmission. For remaining TTIs during the adapted TDD UL-DL configuration, HARQ-ACK transmission can be according to a reference TDD UL-DL configuration, such as for example TDD UL-DL configuration 5. For example, when UE 114 transmits HARQ-ACK information corresponding to DL scheduling during an adapted TDD UL-DL configuration, UE 114 can determine a HARQ-ACK payload according to a bundling window size for a respective TDD UL-DL configuration and use a PUCCH format 3 to transmit the HARQ-ACK information. Conversely, when UE 114 transmits HARQ-ACK corresponding to DL scheduling during a non-adapted TDD UL-DL configuration, it can determine a HARQ-ACK payload according to a bundling window size for the non-adapted TDD UL-DL configuration and use HARQ-ACK multiplexing with PUCCH format 1b to transmit the HARQ-ACK information.

HARQ-ACK Feedback from a UE Regarding a Detection of a PDCCH Conveying a DCI Format Informing of an Adapted TDD UL-DL Configuration In certain embodiments, UE 114 transmits HARQ-ACK information to eNB 102 regarding a detection of a PDCCH transmitted from eNB 102 and conveying a DCI format informing of an adapted TDD UL-DL configuration.

As a PDCCH conveying information for an adapted TDD UL-DL configuration can be detected by a group of UEs, UE 114 may not be able to determine a PUCCH resource (unique for UE 114) for a transmission of HARQ-ACK information informing eNB 102 whether UE 114 detected the PDCCH. In a first alternative, the PDCCH is transmitted in one or more predetermined TTIs and eNB 102 can explicitly configure using higher layer signaling, to each UE in the group of UEs, a PUCCH resource for HARQ-ACK transmission in response to a detection (or absence of detection) of the PDCCH.

In a second alternative, UE 114 can include such HARQ-ACK information together with subsequent HARQ-ACK information regarding PDCCH detections associated with DL scheduling from eNB 102. For example, when transmitting HARQ-ACK information using a PUCCH Format 3, as it was previously described, UE 114 can also include one HARQ-ACK information bit informing eNB 102 whether UE 114 detected (ACK) or failed to detect (DTX) a PDCCH indicating an adaptation of a current TDD UL-DL configuration or, in general, a PDCCH conveying DCI to a group of UEs. UE 114 can transmit a HARQ-ACK information bit regarding a detection of a PDCCH intended for a group of UEs in a predetermined location in a codeword conveyed by PUCCH Format 3, such as for example a first location or a last location.

By providing eNB 102 with HARQ-ACK information for whether or not it detected a PDCCH conveying information for an adapted TDD UL-DL configuration, UE 114 can improve its throughput in case UE 114 failed to detect the PDCCH, for example as eNB 102 can know to avoid transmitting scheduling assignments to UE 114 in DL TTIs UE 114 considers as UL TTIs or UE 114 can avoid power consumption associated with decoding presumed PDCCHs in TTIs with an UL direction.

Figure 29:
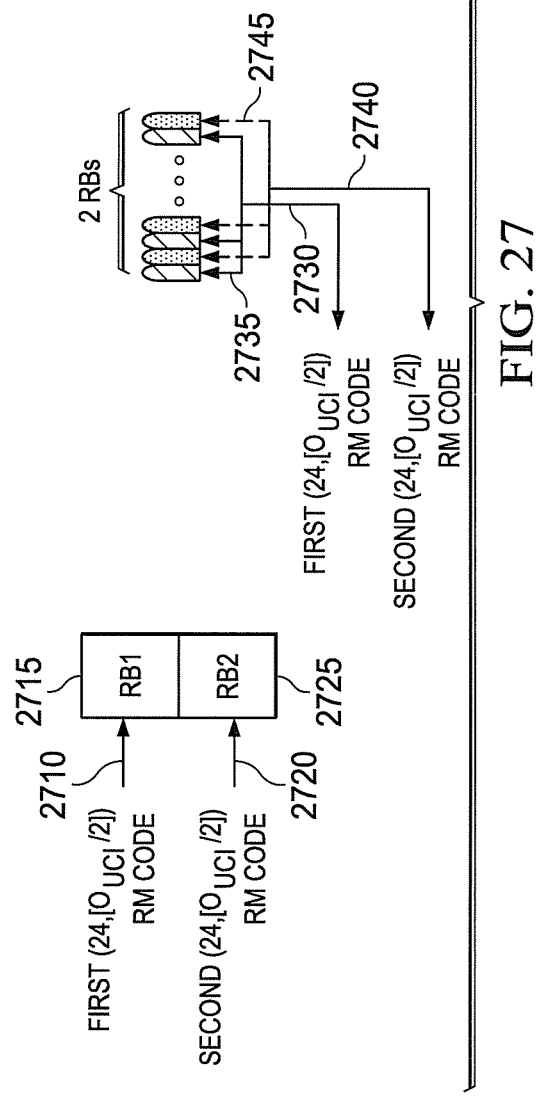
FIG. 29 illustrates an example transmission of HARQ-ACK information from a UE in response to detection or absence of detection by the UE of a PDCCH intended to a group of UEs where the HARQ-ACK information is included with other HARQ-ACK information transmitted from the UE in response to PDCCH detections associated with UE-specific DL scheduling according to this disclosure.

FIG. 29 illustrates an example transmission of HARQ-ACK information from UE 114 in response to detection or absence of detection by UE 114 of a PDCCH intended to a group of UEs where the HARQ-ACK information is included with other HARQ-ACK information transmitted from UE 114 in response to PDCCH detections associated with UE-specific DL scheduling according to this disclosure. The embodiment of the transmission shown in FIG. 29 is for illustration only. Other embodiments could be used without departing from the scope of the present disclosure.

As shown in FIG. 29, UE 114 transmits HARQ-ACK information bits in a PUCCH in response to one or more detections by UE 114 of respective PDCCHs scheduling respective PDSCH receptions to UE 114. UE 114 includes in the PUCCH a HARQ-ACK information bit having a value determined by whether UE 114 detected UE 114-group common PDCCH 2910. UE 114 also includes in the PUCCH one or more HARQ-ACK information bits in response to receptions of PDSCHs 2920. Finally, UE 114 also can multiplex in the PUCCH other UCI, such as P-CSI or SR, if any 2930.

Although the previous realization of the third embodiment of the disclosure considered that a HARQ-ACK information bit regarding a detection of a PDCCH transmitted from eNB 102 to a group of UEs is transmitted by UE 114 in a PUCCH that also conveys HARQ-ACK information bits regarding receptions of PDSCHs, the HARQ-ACK information bit can instead be transmitted by UE 114 in a PUCCH conveying only P-CSI and a resulting PUCCH format is referred to as PUCCH Format 2a (see also REF 1). If UE 114 also conveys HARQ-ACK information bits regarding reception outcomes of PDSCHs, UE 114 can apply bundling to the HARQ-ACK information bits when UE 114 also transmits a HARQ-ACK information bit regarding a detection of a PDCCH transmitted from eNB 102 to a group of UEs so that it transmits, together with the P-CSI, both types of HARQ-ACK information using, respectively, a second bit and a first bit and a resulting PUCCH format is referred to as PUCCH Format 2b (see also REF 1).

Acknowledgement information from UE 114 regarding a detection of a PDCCH informing of an adapted TDD UL-DL configuration can also be implicit without a direct transmission of HARQ-ACK information. As previously described, UE 114 operating with an adapted TDD UL-DL configuration is assumed to report two types of CSI; one for a first configured set of TTIs, such as DL fixed TTIs and possibly some flexible DL TTIs and another for a second configured set of TTIs, such as remaining DL flexible TTIs in an adapted TDD UL-DL configuration. This is needed because the interference conditions experienced by UE 114 can vary among DL TTIs depending on whether or not an interfering cell uses that TTI as a DL one or as an UL one. When UE 114 fails to detect a PDCCH conveying a DCI format informing of an adapted TDD UL-DL configuration, UE 114 reverts to a conventional TDD UL-DL configuration (non-adapted) that can be different than the adapted one. As UE 114 does not know the adapted TDD UL-DL configuration, UE 114 cannot know of resources available for measuring CSI in DL flexible TTIs (does not have a valid resource for CSI measurement in respective set of TTIs) and providing such a CSI report to eNB 102 may not be useful as it is likely to be inaccurate and UE 114 anyway follows a conventional TDD UL-DL configuration where it is not scheduled PDSCH transmissions in DL flexible TTIs. UE 114 can therefore set the CSI report for a second set of TTIs to a predetermined value, such as an Out-Of-Range (OOR) value. ENB 102 can then use the reported CSI value to determine whether or not UE 114 detected the PDCCH informing of a respective adapted TDD UL-DL configuration.

Furthermore, when UE 114 is in DRX mode in DL TTIs where eNB 102 transmits the PDCCH conveying the DCI format informing of an adapted TDD UL-DL configuration, eNB 102 knows that UE 114 fails to detect the DCI format and UE 114 can skip the CSI transmission for the second set of TTIs in order to conserve power and reduce interference.

Interpretation of a DCI Format Field as an UL Index Field or as an UL DAI Field

In certain embodiments, UE 114 configured for operation with an adapted TDD UL-DL configuration and with TDD UL-DL configuration 0 for operation with a non-adapted TDD UL-DL configuration, such as when UE 114 fails to detect a PDCCH informing of an adapted TDD UL-DL configuration, can interpret a field in a DCI format scheduling a PUSCH as an UL DAI. Conversely, UE 114 that is not configured for operation with and adapted TDD UL-DL configuration and operates with TDD UL-DL configuration 0 always interprets a field in a DCI format scheduling a PUSCH as an UL index.

For UE 114 configured for operation with an adapted TDD UL-DL configuration, using always a field as an UL DAI can result in a restriction that a PUSCH transmission can be scheduled only in a subset of UL TTIs. However, this restriction may not have a material impact in an UL cell throughput as UEs that are not configured for operation with an adapted TDD UL-DL configuration can be scheduled in all UL TTIs. Moreover, as previously mentioned for UE 114 configured for operation with an adapted TDD UL-DL configuration, an UL DAI is needed only in a DCI format scheduling a PUSCH when the PUSCH is transmitted in an UL TTI where UE 114 can transmit HARQ-ACK; when the PUSCH is transmitted in an UL TTI where UE 114 does not transmit HARQ-ACK, the UL DAI is not needed and the field can serve as an UL index when TDD UL-DL configuration 0 is the conventional TDD UL-DL configuration.

If eNB 102 schedules a PUSCH transmission from UE 114 configured for operation with an adapted TDD UL-DL configuration and eNB 102 expects UE 114 to detect a PDCCH conveying a DCI format that indicates an adapted TDD UL-DL configuration, eNB 102 can use a field in a DCI format scheduling a PUSCH as UL index, at least in some TTIs, in case TDD UL-DL configuration 0 is the conventional one and as UL DAI in case any other TDD UL-DL configuration is the conventional one. The interpretation of the UL DAI field is according to a reference TDD UL-DL configuration that is configured to UE 114 for transmission of HARQ-ACK information. If eNB 102 does not expect UE 114 to detect the PDCCH, for example when UE 114 is in DRX in DL TTIs of the PDCCH transmission, both eNB 102 and UE 114 know that UE 114 operates with the conventional TDD UL-DL configuration for the next validity period of an adaptation of a TDD UL-DL configuration. Then, if TDD UL-DL configuration 0 is the conventional one, the field can be assumed to function as an UL index in all TTIs (instead of functioning as an UL index only in the TTIs where UE 114 does not transmit HARQ-ACK information). For UEs that are not configured for operation with an adapted TDD UL-DL configuration and do not operate with TDD UL-DL configuration 0, the field in always used as an UL DAI.

Figure 30:
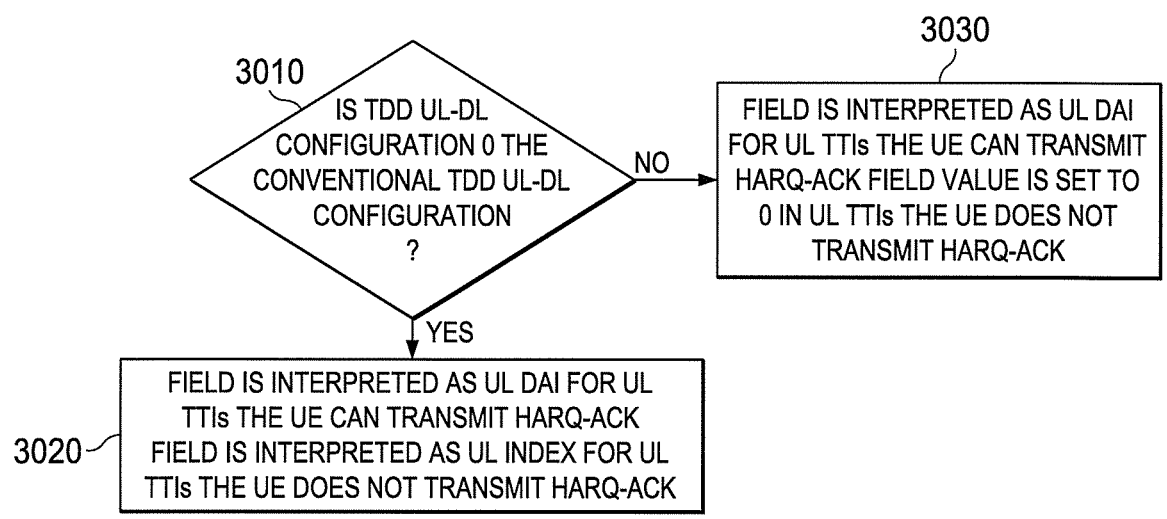
FIG. 30 illustrates an example interpretation of a field in a DCI format scheduling a PUSCH either as an UL index or as an UL DAI by a UE configured to operate with an adapted TDD UL-DL configuration and with TDD UL-DL configuration 0 as the conventional TDD UL-DL configuration according to this disclosure.

FIG. 30 illustrates an example interpretation of a field in a DCI format scheduling a PUSCH either as an UL index or as an UL DAI for UE 114 configured to operate with an adapted TDD UL-DL configuration and with TDD UL-DL configuration 0 as the conventional TDD UL-DL configuration according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 30, UE 114 configured for operation with an adapted TDD UL-DL configuration and can receive a PDCCH conveying a DCI format indicating an adapted TDD UL-DL configuration, determines whether TDD UL-DL configuration 0 is the conventional TDD UL-DL configuration in operation 3010. If it is, UE 114 interprets the field in a DCI format scheduling a PUSCH as an UL index when the PUSCH transmission in an UL TTI where UE 114 does not transmit HARQ-ACK information and as an UL DAI when the PUSCH transmission is in an UL TTI where UE 114 can transmit HARQ-ACK information in operation 3020. If it is not, UE 114 interprets a field in a DCI format scheduling a PUSCH as an UL DAI field in operation 3030 when the PUSCH is transmitted in an UL TTI where UE 114 can transmit HARQ-ACK information and as having a predetermined value, such as zero, when the PUSCH is transmitted in an UL TTI where UE 114 does not transmit HARQ-ACK information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for wireless communication, the method comprising:
   identifying a first set of two or more subframes within a frame and a second set of two or more subframes within the frame;
   receiving a first physical uplink control channel (PUCCH) resource offset to be used with the first set of subframes and a second PUCCH resource offset to be used with the second set of subframes;
   receiving data in a first subframe within the frame;
   determining a PUCCH resource for a hybrid automatic repeat request acknowledgement (HARQ-ACK) signal based on one of the first PUCCH resource offset and the second PUCCH resource offset, wherein the PUCCH resource for the HARQ-ACK signal is determined based on the first PUCCH resource offset when the first subframe belongs to the first set of subframes and the PUCCH resource for the HARQ-ACK signal is determined based on the second PUCCH resource offset when the first subframe belongs to the second set of subframes; and
   transmitting the HARQ-ACK signal using the determined PUCCH resource.

2. A method for wireless communication, the method comprising:
   receiving a first physical uplink control channel (PUCCH) resource offset and a second PUCCH resource offset;
   identifying a first set of subframes and a second set of subframes;
   receiving data in a first subframe;
   determining a PUCCH resource for a hybrid automatic repeat request acknowledgement (HARQ-ACK) signal based on one of the first PUCCH resource offset and the second PUCCH resource offset, wherein the PUCCH resource for the HARQ-ACK signal is determined based on the first PUCCH resource offset when the first subframe belongs to the first set of subframes and the PUCCH resource for the HARQ-ACK signal is determined based on the second PUCCH resource offset when the first subframe belongs to the second set of subframes; and
   transmitting the HARQ-ACK signal using the determined PUCCH resource,
   wherein the first PUCCH resource offset is received through system information block (SIB) signaling and the second PUCCH resource offset is received through higher layer signaling.

3. The method of claim 1, wherein the first set of subframes comprises a subframe, and wherein a UL subframe for HARQ-ACK signal transmission associated with the subframe is the same as a UL subframe in a first UL/DL configuration.

4. The method of claim 1, wherein the second set of subframes comprises a subframe, and wherein a UL subframe for HARQ-ACK signal transmission associated with the subframe is different from a UL subframe in a first UL/DL configuration.

5. The method of claim 4, wherein the first UL/DL configuration is predetermined.

6. A user equipment, the user equipment comprising:
   processing circuitry configured to identify a first set of two or more subframes within a frame and a second set of two or more subframes within the frame; and
   a receiver configured to receive a first physical uplink control channel (PUCCH) resource offset to be used with the first set of subframes and a second PUCCH resource offset to be used with the second set of subframes, wherein the receiver is configured to receive data in a first subframe within the frame, and
   wherein the processing circuitry is configured to determine a PUCCH resource for a hybrid automatic repeat request acknowledgement (HARQ-ACK) signal based on one of the first PUCCH resource offset and the second PUCCH resource offset, wherein the PUCCH resource for the HARQ-ACK signal is determined based on the first PUCCH resource offset when the first subframe belongs to the first set of subframes and the PUCCH resource for the HARQ-ACK signal is determined based on the second PUCCH resource offset when the first subframe belongs to the second set of subframes; and
   a transmitter configured to transmit the HARQ-ACK signal using the determined PUCCH resource.

7. The user equipment of claim 6, wherein the first PUCCH resource offset is received through system information block (SIB) signaling and the second PUCCH resource offset is received through higher layer signaling.

8. The user equipment of claim 6, wherein the first set of subframes comprises a subframe, and wherein a UL subframe for HARQ-ACK signal transmission associated with the subframe is the same as a UL subframe in a first UL/DL configuration.

9. The user equipment of claim 6, wherein the second set of subframes comprises a subframe, and wherein a UL subframe for HARQ-ACK signal transmission associated with the subframe is different from a UL subframe in a first UL/DL configuration.

10. The user equipment of claim 9, wherein the first UL/DL configuration is predetermined.

11. A method for wireless communication, the method comprising:
   transmitting data in a first subframe within one of a first set of two or more subframes within a frame or a second set of two or more subframes within the frame;
   transmitting a first physical uplink control channel (PUCCH) resource offset to be used with the first set of subframes and a second PUCCH resource offset to be used with the second set of subframes;
   determining a PUCCH resource for a hybrid automatic repeat request acknowledgement (HARQ-ACK) signal based on one of the first PUCCH resource offset and the second PUCCH resource offset, wherein the PUCCH resource for the HARQ-ACK signal is determined based on the first PUCCH resource offset when the first subframe belongs to the first set of subframes and the PUCCH resource for the HARQ-ACK signal is determined based on the second PUCCH resource offset when the first subframe belongs to the second set of subframes; and receiving the HARQ-ACK signal using the determined PUCCH resource.

12. The method of claim 11, wherein the first PUCCH resource offset is transmitted through system information block (SIB) signaling and the second PUCCH resource offset is received through higher layer signaling.

13. The method of claim 11, wherein the first set of subframes comprises a subframe, and wherein a UL subframe for HARQ-ACK signal transmission associated with the subframe is the same as a UL subframe in a first UL/DL configuration.

14. The method of claim 11, wherein the second set of subframes comprises a subframe, and wherein a UL subframe for HARQ-ACK signal transmission associated with the subframe is different from a UL subframe in a first UL/DL configuration.

15. The method of claim 14, wherein the first UL/DL configuration is predetermined.

16. A base station, the base station comprising:
a transmitter configured to transmit
  a first physical uplink control channel (PUCCH) resource offset and a second PUCCH resource offset, and
  data in a first subframe within one of a first set of subframes within a frame and a second set of subframes within the frame;
a controller configured to determine a PUCCH resource for a hybrid automatic repeat request acknowledgement (HARQ-ACK) signal based on one of the first PUCCH resource offset and the second PUCCH resource offset, wherein the PUCCH resource for the HARQ-ACK signal is determined based on the first PUCCH resource offset when the first subframe belongs to the first set of subframes and the PUCCH resource for the HARQ-ACK signal is determined based on the second PUCCH resource offset when the first subframe belongs to the second set of subframes; and
a receiver configured to receive the HARQ-ACK signal using the determined PUCCH resource.

17. The base station of claim 16, wherein the first PUCCH resource offset is transmitted through system information block (SIB) signaling and the second PUCCH resource offset is transmitted through higher layer signaling.

18. The base station of claim 16, wherein the first set of subframes comprises a subframe, and wherein a UL subframe for HARQ-ACK signal transmission associated with the subframe is the same as a UL subframe in a first UL/DL configuration.

19. The base station of claim 16, wherein the second set of subframes comprises a subframe, and wherein a UL subframe for HARQ-ACK signal transmission associated with the subframe is different from a UL subframe in a first UL/DL configuration.

20. The base station of claim 19, wherein the first UL/DL configuration is predetermined.

* * * * *